United States Patent
Reuter et al.

(10) Patent No.: US 9,803,103 B2
(45) Date of Patent: Oct. 31, 2017

(54) AQUEOUS DISPERSION OF A COPOLYMER

(71) Applicant: BASF Coatings GmbH, Muenster (DE)

(72) Inventors: Hardy Reuter, Muenster (DE);
Bernhard Steinmetz, Ruetschenhausen (DE); Matthias Blohm, Muenster (DE);
Carsten Teichmann, Duelmen (DE);
Bianca Goeb, Werneck (DE)

(73) Assignee: BASF Coating GmbH, Muenster (DE)

( * ) Notice: Subject to any disclaimer, the term of this patent is extended or adjusted under 35 U.S.C. 154(b) by 0 days.

(21) Appl. No.: 14/905,595

(22) PCT Filed: Jun. 4, 2014

(86) PCT No.: PCT/EP2014/061551
§ 371 (c)(1),
(2) Date: Jan. 15, 2016

(87) PCT Pub. No.: WO2015/007427
PCT Pub. Date: Jan. 22, 2015

(65) Prior Publication Data
US 2016/0152862 A1    Jun. 2, 2016

(30) Foreign Application Priority Data
Jul. 17, 2013  (EP) .................................... 13176912

(51) Int. Cl.
| | | |
|---|---|---|
| C08G 18/42 | (2006.01) | |
| C09D 151/08 | (2006.01) | |
| C08G 18/48 | (2006.01) | |
| C08G 18/66 | (2006.01) | |
| C08G 18/75 | (2006.01) | |
| C08G 18/76 | (2006.01) | |
| C08G 18/81 | (2006.01) | |
| C08F 283/00 | (2006.01) | |
| C08F 290/06 | (2006.01) | |
| C08G 18/08 | (2006.01) | |
| C08G 18/10 | (2006.01) | |
| C09D 175/06 | (2006.01) | |
| C09D 175/08 | (2006.01) | |
| C08G 18/32 | (2006.01) | |
| C08G 18/34 | (2006.01) | |
| B05D 7/00 | (2006.01) | |

(52) U.S. Cl.
CPC ........... *C09D 151/08* (2013.01); *B05D 7/532* (2013.01); *C08F 283/006* (2013.01); *C08F 290/067* (2013.01); *C08G 18/0823* (2013.01); *C08G 18/10* (2013.01); *C08G 18/3271* (2013.01); *C08G 18/348* (2013.01); *C08G 18/4288* (2013.01); *C08G 18/4854* (2013.01); *C08G 18/6633* (2013.01); *C08G 18/6692* (2013.01); *C08G 18/755* (2013.01); *C08G 18/765* (2013.01); *C08G 18/8108* (2013.01); *C08G 18/8141* (2013.01); *C09D 175/06* (2013.01); *C09D 175/08* (2013.01)

(58) Field of Classification Search
CPC ............................ C09D 151/08; B05D 7/532
USPC ......................................................... 524/500
See application file for complete search history.

(56) References Cited

U.S. PATENT DOCUMENTS

| | | | |
|---|---|---|---|
| 6,632,915 B1 * | 10/2003 | Schwarte | C08F 257/02 523/201 |
| 6,770,702 B1 * | 8/2004 | Muller | C08F 265/04 524/507 |
| 2004/0234487 A1 | 11/2004 | Bremser et al. | |

FOREIGN PATENT DOCUMENTS

| | | |
|---|---|---|
| DE | 40 09 858 A1 | 10/1991 |
| DE | 44 37 535 A1 | 4/1996 |
| DE | 199 30 665 A1 | 1/2001 |
| DE | 199 48 004 A1 | 7/2001 |
| DE | 100 43 405 C1 | 6/2002 |
| EP | 0 228 003 A1 | 7/1987 |
| EP | 0 634 431 A1 | 1/1995 |
| EP | 1 173 491 A2 | 1/2002 |
| EP | 1 185 568 A2 | 3/2002 |
| EP | 1 218 434 A1 | 7/2002 |
| EP | 1 330 480 A1 | 7/2003 |
| WO | 92/15405 A1 | 9/1992 |
| WO | 01/25307 A1 | 4/2001 |
| WO | 03/025041 A1 | 3/2003 |
| WO | 2006/040284 A1 | 4/2006 |

OTHER PUBLICATIONS

International Search Report dated Aug. 20, 2014 for PCT/EP2014/061551 filed on Jun. 4, 2014.

\* cited by examiner

*Primary Examiner* — Hui Chin
(74) *Attorney, Agent, or Firm* — Oblon, McClelland, Maier & Neustadt, L.L.P.

(57) ABSTRACT

An aqueous dispersion containing at least one copolymer, the copolymer being preparable by initially charging an aqueous dispersion of at least one polyurethane, and then polymerizing a mixture of olefinically unsaturated monomers in the presence of the polyurethane, where a water-soluble initiator is used, the metered addition of the olefinically unsaturated monomers is effected in such a way that a concentration of 6.0% by weight, based on the total amount of olefinically unsaturated monomers, in the reaction solution is not exceeded over the entire duration of the reaction, and the mixture of the olefinically unsaturated monomers contains at least one polyolefinically unsaturated monomer.

17 Claims, 1 Drawing Sheet

Comparison of the transmission electron micrographs of unpigmented polymer films comprising isoprene-containing polyurethane (PU) – polyacrylates (PAC) copolymers Polyurethane (PU) – poly(meth)acrylate (PAC) – copolymer:
Poly(meth)acrylate copolymer contains 15 mol% of isoprene, contrasted with OsO₄

Production example

D-A3   D-B3

Idealized core-shell morphology:

| Polyurethane (light) | Polyacrylate (dark (contrasted)) |
|---|---|
|  |  |

Transmission electron microscopy:

| Polyurethane (light) | Polyacrylate (dark (contrasted)) |
|---|---|
|  |  |
| 200 nm | 200 nm |

Polyacrylate contrasting: OsO₄

Continuous phase

Polyurethane                                          Polyacrylate

AQUEOUS DISPERSION OF A COPOLYMER

The present invention relates to aqueous dispersions of copolymers, and to the preparation and use thereof, especially in the field of automotive finishing.

The prior art discloses copolymers having a core-shell structure.

The document EP 1 218 434 B1 discloses a graft copolymer based on polyurethane and the use thereof for production of coating materials, adhesives and sealing compounds.

Documents EP 1 185 568 B1 and EP 1 173 491 B1 describe copolymers having a core-shell structure, the exterior of which is fully crosslinked, where the core consists of polyacrylate and the shell may consist of polyurethane.

Document EP 1 330 480 B1 describes copolymers where the core consists of sulfide-containing polyurethanes and the shell of polyacrylate.

The copolymers known from the prior art are in the form of aqueous dispersions and can be used for the production of aqueous coating materials, especially for waterborne basecoats.

These waterborne basecoats can be used in what is called the basecoat/clearcoat method, a wet-on-wet method, for the color and/or effect coat of a multicoat paint system.

The known methods are in need of improvement particularly with regard to the occurrence of pinholes, visible as very small holes in the clearcoat and basecoat. Grind mark concealment capacity and adhesion in the case of multicoat finishing are inadequate in the case of coatings known from the prior art.

The objective underlying the present invention thus consists in providing an aqueous dispersion of a copolymer of the type described above, which can be used for the binder of the color and/or effect layer of a multicoat paint system improved over the prior art.

More particularly, this should have only very few pinholes, if any, and/or a higher pinholing limit. The pinholing limit refers to the dry basecoat thickness above which pinholes occur. At the same time, grind mark concealment capacity and adhesion in the case of multicoat finishing, for example in the form of refinishing, are to be improved.

It has been found that, surprisingly, the complex objective underlying this invention is achieved by providing
an aqueous dispersion comprising at least one copolymer, the copolymer being preparable by
 (i) initially charging an aqueous dispersion of at least one polyurethane, and then
 (ii) polymerizing a mixture of olefinically unsaturated monomers in the presence of the polyurethane from (i), where
  (a) a water-soluble initiator is used,
  (b) the metered addition of the olefinically unsaturated monomers is effected such that a concentration of 6.0% by weight, based on the total amount of olefinically unsaturated monomers, in the reaction solution is not exceeded over the entire duration of the reaction, and
  (c) the mixture of the olefinically unsaturated monomers comprises at least one polyolefinically unsaturated monomer.

The invention also relates to a process for producing the inventive dispersions, to the use of said aqueous dispersions in coating materials, especially basecoat materials, to waterborne basecoat materials comprising the abovementioned dispersions, and to a process for producing multicoat paint systems.

Pinholes are very small holes in the clearcoat and basecoat, which are visible in the finished coating. They are one of the most common surface defects in spray paints. The defects referred to as pinholes in the description and patent examples which follow are characterized by funnel-shaped holes which continue into cylindrical tubes in the order of magnitude of a pinpoint impression, which have a mean diameter of the funnel opening of about 300 to 700 µm and a mean tube diameter of about 15 to 60 µm, and pass through the clearcoat and basecoat to reach the coat beneath. They may be the result of escaping gases, such as trapped air, or vaporizing liquids.

The term "(meth)acrylate" shall refer hereinafter both to acrylate and to methacrylate.

A copolymer in the context of the present invention refers to polymer particles formed from different polymers. This explicitly includes both polymers bonded covalently to one another and those in which the different polymers are bound to one another by adhesion. Combinations of the two types of bonding are also covered by this definition.

The inventive dispersions and the process for producing these dispersions are characterized by the production steps thereof.

In a first production step, an aqueous dispersion of a polyurethane resin is initially charged.

Suitable saturated or unsaturated polyurethane resins are described, for example, in
  German patent application DE 199 48 004 A1, page 4 line 19 to page 11 line 29 (polyurethane prepolymer B1)
  European patent application EP 0 228 003 A1, page 3 line 24 to page 5 line 40,
  European patent application EP 0 634 431 A1, page 3 line 38 to page 8 line 9, or
  international patent application WO 92/15405, page 2 line 35 to page 10 line 32.

For the preparation of the polyurethane resin, preference is given to using the aliphatic, cycloaliphatic, aliphatic-cycloaliphatic, aromatic, aliphatic-aromatic and/or cycloaliphatic-aromatic polyisocyanates known to those skilled in the art. Particular preference is given to aliphatic and aliphatic-cycloaliphatic polyurethane resins.

The alcohol components used for the preparation of the polyurethane resins are preferably the saturated and unsaturated polyols known to those skilled in the art, and optionally, in minor amounts, also monoalcohols. Particularly diols and optionally, in minor amounts, triols are used for introduction of branches. Examples of suitable polyols are saturated or olefinically unsaturated polyester polyols and/or polyether polyols. The polyols used are especially polyester polyols, especially those having a number-average molecular weight of 400 to 5000 g/mol (measured by means of vapor pressure osmometry).

Preferably, the polyurethane initially charged in aqueous dispersion is a hydrophilically stabilized polyurethane. For hydrophilic stabilization or for increasing dispersibility in aqueous medium, the polyurethane resin may contain particular ionic groups and/or groups which can be converted to ionic groups (potentially ionic groups). Such polyurethane resins are referred to in the context of the present invention as ionically hydrophilically stabilized polyurethane resins. It is likewise possible for nonionic hydrophilically modified groups to be present. Preference is given, however, to the ionically hydrophilically stabilized polyurethanes. More specifically, the modifying groups are functional groups which can be converted to cations by neutralizing agents and/or quaternizing agents, and/or cationic groups (cationic modification)

or functional groups which can be converted to anions by neutralizing agents, and/or anionic groups (anionic modification)

or nonionic hydrophilic groups (nonionic modification)

or combinations of the aforementioned groups.

As the person skilled in the art is aware, the functional groups for cationic modification are, for example, primary, secondary and/or tertiary amino groups, secondary sulfide groups and/or tertiary phosphine groups, especially tertiary amino groups and secondary sulfide groups (functional groups which can be converted to cationic groups by neutralizing agents and/or quaternizing agents). Mention should additionally be made of the cationic groups prepared from the aforementioned functional groups using neutralizing agents and/or quaternizing agents known to those skilled in the art, such as primary, secondary, tertiary and/or quaternary ammonium groups, tertiary sulfonium groups and/or quaternary phosphonium groups, especially quaternary ammonium groups and tertiary sulfonium groups.

As is well known, the functional groups for anionic modification are, for example, carboxylic acid, sulfonic acid and/or phosphonic acid groups, especially carboxylic acid groups (functional groups which can be converted to anionic groups by neutralizing agents), and anionic groups prepared from the aforementioned functional groups using neutralizing agents known to those skilled in the art, such as carboxylate, sulfonate and/or phosphonate groups.

The functional groups for nonionic hydrophilic modification are preferably poly(oxyalkylene) groups, especially poly(oxyethylene) groups.

The ionic hydrophilic modifications can be introduced into the polyurethane resin by means of monomers containing the ionic or potentially ionic groups. The nonionic modifications are introduced as lateral or terminal groups in the polyurethane molecules, for example through the incorporation of poly(ethylene oxide) polymers. The hydrophilic modifications are introduced, for example, using compounds containing at least one group reactive toward isocyanate groups, preferably at least one hydroxyl group. For introduction of the ionic modification, it is possible to use monomers which, as well as the modifying groups, contain at least one hydroxyl group. For introduction of the nonionic modifications, preference is given to using the polyether diols and/or alkoxy poly(oxyalkylene) alcohols known to those skilled in the art.

Preference is given to adding at least one solvent to the initially charged polyurethane dispersion, the solvent being miscible in any ratio with water and in any ratio with the mixture of olefinically unsaturated monomers. Particularly suitable solvents are n-methylpyrrolidone, N-ethylpyrrolidone and ether alcohols, such as especially methoxypropanol.

As the next preparation step, a polymerization of a mixture of olefinically unsaturated monomers is performed in the presence of the polyurethane by the methods of what are called free-radical emulsion polymerizations in the presence of at least one polymerization initiator.

The polymerization initiator used must be a water-soluble initiator. Examples of suitable initiators are potassium peroxodisulfate, sodium peroxodisulfate or ammonium peroxodisulfate, and also hydrogen peroxide, tert-butyl hydroperoxide, 2,2'-azobis(2-amidoisopropane)dihydrochloride, 2,2'-azobis(N,N'-dimethyleneisobutyramidine)dihydrochloride or 2,2'-azobis(4-cyanopentanoic acid). The initiators are used either alone or in a mixture, for example mixtures of hydrogen peroxide and sodium persulfate. It is also possible to use the known redox initiator systems as polymerization initiators. Such redox initiator systems contain at least one peroxide-containing compound in combination with a redox coinitiator, for example reducing sulfur compounds, for example bisulfites, sulfites, thiosulfates, dithionites or tetrathionates of alkali metals and ammonium compounds, sodium hydroxymethanesulfinate dihydrate and/or thiourea. For instance, it is possible to use combinations of peroxodisulfates with alkali metal or ammonium hydrogen sulfites, for example ammonium peroxodisulfate and ammonium disulfite. The weight ratio of peroxide-containing compounds to the redox coinitiators is preferably 50:1 to 0.05:1. In combination with the initiators or the redox initiator systems, it is additionally possible to use transition metal catalysts, for example iron salts, nickel salts, cobalt salts, manganese salts, copper salts, vanadium salts or chromium salts, such as iron(II) sulfate, cobalt(II) chloride, nickel(II) sulfate, copper(I) chloride, manganese(II) acetate, vanadium(III) acetate, manganese(II) chloride. Based on the monomers, these transition metal salts are used typically in amounts of 0.1 to 1000 ppm. For instance, it is possible to use combinations of hydrogen peroxide with iron(II) salts, for example 0.5 to 30% hydrogen peroxide and 0.1 to 500 ppm Mohr's salt.

Initiators are preferably used in an amount of 0.05 to 20% by weight, preferably 0.05 to 10% by weight, more preferably 0.1 to 5% by weight, based on the total weight of the olefinically unsaturated monomers.

The result of use of the water-soluble initiator is that olefinically unsaturated monomers which are added to the initially charged aqueous dispersion can react immediately to give oligomers. These oligomers have a lower tendency of penetrating into the polyurethane particles in the initially charged dispersion than the smaller monomers.

The polymerization is appropriately conducted at a temperature of 0 to 160° C., preferably 60 to 95° C.

In this context, preference is given to the working with exclusion of oxygen, preferably in a nitrogen stream. In general, the polymerization is performed at standard pressure, but employment of lower pressures or higher pressures is also possible, especially when polymerization temperatures above the boiling point of the monomers and/or solvents are employed.

The inventive polymers are prepared by free-radical aqueous emulsion polymerization, and it is possible to add surfactants or protective colloids to the reaction medium. A list of suitable emulsifiers and protective colloids can be found, for example, in Houben Weyl, Methoden der organischen Chemie [Methods of Organic Chemistry], volume XIV/1 Makromolekulare Stoffe [Macromolecular substances], Georg Thieme Verlag, Stuttgart 1961, p. 411 ff.

An important factor for the production of the inventive aqueous dispersion is the control of the conditions of the polymerization reaction of the mixture of olefinically unsaturated monomers in the presence of the polyurethane. This is performed in the manner of a "starved feed polymerization".

A starved feed polymerization in the context of the present invention is regarded as being an emulsion polymerization in which the content of the residual monomers in the reaction solution is minimized over the duration of the reaction, meaning that the olefinically unsaturated monomers are metered in in such a way that a concentration of 6.0% by weight, preferably 5.0% by weight, more preferably 4.0% by weight, in the reaction solution, based in each case on the total amount of olefinically unsaturated monomers, is not exceeded over the entire duration of the reaction.

The concentration of the monomers in the reaction solution can be determined here by gas chromatography.

The concentration of monomers in the reaction solution, referred to hereinafter as free monomers, can be controlled in various ways.

One means of keeping the concentration of free monomers low is to choose a very low metering rate of the mixture of olefinically unsaturated monomers. When the rate of metered addition is sufficiently low that all monomers can react very quickly as soon as they are in the reaction solution, it is possible to ensure that the concentration of the free monomers is minimized.

As well as the metering rate, it is important that sufficient free radicals are always present in the reaction solution, such that the monomers metered in can each be reacted very rapidly. For this purpose, the reaction conditions should preferably be selected such that the initiator feed is already commenced before commencement of the metered addition of the olefinically unsaturated monomers. Preference is given to commencing the metered addition at least 5 minutes earlier, more preferably at least 10 minutes earlier. Preferably at least 10% by weight, more preferably at least 20% by weight, most preferably at least 30% by weight, of the initiator, based in each case on the total amount of initiator, is added before commencement of the metered addition of the olefinically unsaturated monomers.

The amount of initiator is an important factor for the sufficient presence of free radicals in the reaction solution. The amount of initiator should be selected such that sufficient free radicals are available at any time, such that the monomers metered in can react. If the amount of initiator is increased, it is also possible to react larger amounts of monomers at the same time.

A further factor which determines the reaction rate is the structure of the monomers.

The concentration of the free monomers can thus be controlled through the interplay of the amount of initiator, rate of initiator addition, rate of monomer addition, and through the selection of the monomers. Both the slowing of the metered addition and the increasing of the amount of initiator, and also the early commencement of the addition of the initiator, serve the purpose of keeping the concentration of the free monomers below the limits mentioned above.

At any time in the reaction, the concentration of the free monomers can be determined by gas chromatography. Typical parameters for the determination are as follows: 50 m silica capillary column with polyethylene glycol phase or 50 m silica capillary column with polydimethylsiloxane phase, helium carrier gas, split injector 150° C., oven temperature 40 to 220° C., flame ionization detector, detector temperature 275° C., isobutyl acrylate internal standard.

Should any concentration of free monomers which comes close to the limit for the starved feed polymerization be determined in this analysis, for example because of a very low level of reactive olefinically unsaturated monomers, the abovementioned parameters can be utilized for control of the reaction. In this case, for example, the metering rate of the monomers can be reduced or the amount of initiator increased.

Suitable olefinically unsaturated monomers may be mono- or polyolefinically unsaturated.

Examples of suitable monoolefinically unsaturated monomers include (meth)acrylate-based monoolefinically unsaturated monomers, vinylic monoolefinically unsaturated monomers, alpha-beta-unsaturated carboxylic acids, and allyl compounds.

The (meth)acrylate-based, monoolefinically unsaturated monomers may, for example, be (meth)acrylic acid and esters, nitriles, or amides of (meth)acrylic acid.

Preference is given to esters of (meth)acrylic acid having an olefinically unsaturated R radical.

The R radical may be aliphatic or aromatic. The R radical is preferably aliphatic.

The R radical may, for example, be an alkyl radical, or contain heteroatoms. The examples of R radicals containing heteroatoms are ethers. The R radical is preferably an alkyl radical.

If R is an alkyl radical, it may be a linear, branched or cyclic alkyl radical. In all three cases, the alkyl radicals may be unsubstituted alkyl radicals or alkyl radicals substituted by functional groups. The alkyl radical preferably has 1 to 20, more preferably 1 to 10, carbon atoms.

Especially preferentially suitable monounsaturated esters of (meth)acrylic acid having an unsubstituted alkyl radical are methyl(meth)acrylate, ethyl(meth)acrylate, propyl (meth)acrylate, isopropyl(meth)acrylate, n-butyl(meth)acrylate, isobutyl(meth)acrylate, tert-butyl(meth)acrylate, amyl (meth)acrylate, hexyl(meth)acrylate, ethylhexyl(meth) acrylate, 3,3,5-trimethylhexyl(meth)acrylate, stearyl(meth) acrylate, lauryl(meth)acrylate, cycloalkyl(meth)acrylates such as cyclopentyl(meth)acrylate, isobornyl(meth)acrylate and cyclohexyl(meth)acrylate, very particular preference being given to n- and tert-butyl(meth)acrylate and methyl methacrylate.

Suitable monounsaturated esters of (meth)acrylic acid having a substituted alkyl radical may preferably be substituted by one or more hydroxyl groups.

Especially preferentially suitable monounsaturated esters of (meth)acrylic acid having an alkyl radical substituted by one or more hydroxyl groups are 2-hydroxyethyl(meth) acrylate, 2-hydroxypropyl(meth)acrylate, 3-hydroxypropyl (meth)acrylate, 3-hydroxybutyl(meth)acrylate and 4-hydroxybutyl(meth)acrylate.

The vinylic monounsaturated monomers may be monomers having an olefinically unsaturated R' radical on the vinyl group.

The R' radical may be aliphatic or aromatic, preference being given to aromatic radicals.

The R' radical may be a hydrocarbyl radical, or contain heteroatoms.

Examples of R' radicals containing heteroatoms are ethers, esters, amides, nitriles and heterocycles.

The R' radical is preferably a hydrocarbyl radical.

If R' is a hydrocarbyl radical, it may be substituted by heteroatoms or unsubstituted, preference being given to unsubstituted radicals.

The R' radical is preferably an aromatic hydrocarbyl radical.

Particularly preferred vinylic olefinically unsaturated monomers are vinylaromatic hydrocarbons, especially vinyltoluene, alpha-methylstyrene and especially styrene. When heteroatoms are present, preference is given to olefinically unsaturated monomers such as acrylonitrile, methacrylonitrile, acrylamide, methacrylamide, N,N-dimethylacrylamide, vinyl acetate, vinyl propionate, vinyl chloride, N-vinylpyrrolidone, N-vinylcaprolactam, N-vinylformamide, N-vinylimidazole and N-vinyl-2-methylimidazoline.

Examples of suitable polyolefinically unsaturated monomers include esters of (meth)acrylic acid having an olefinically unsaturated R" radical and allyl ethers of mono- or polyhydric alcohols. The R" radical may be an allyl radical or a (meth)acrylic ester.

Preferred polyolefinically unsaturated monomers include ethylene glycol di(meth)acrylate, 1,2-propylene glycol di(meth)acrylate, 1,3-propylene glycol di(meth)acrylate, butane-1,4-diol di(meth)acrylate, neopentyl glycol di(meth) acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate and allyl(meth)acrylate.

In addition, preferred polyolefinically unsaturated compounds include acrylic and methacrylic esters of alcohols having more than 2 OH groups, for example trimethylolpropane tri(meth)acrylate or glyceryl tri(meth)acrylate, but also trimethylolpropane di(meth)acrylate monoallyl ether, trimethylolpropane (meth)acrylate diallyl ether, pentaerythritol tri(meth)acrylate monoallyl ether, pentaerythritol di(meth)acrylate diallyl ether, pentaerythritol (meth)acrylate triallyl ether, triallylsucrose and pentaallylsucrose.

Particular preference is given to using allyl methacrylate.

The mixture of the olefinically unsaturated monomers comprises at least one polyolefinically unsaturated monomer. The mixture of olefinically unsaturated monomers preferably also comprises one or more monounsaturated esters of (meth)acrylic acid having an unsubstituted alkyl radical.

The mixture of the olefinically unsaturated monomers contains preferably 0.1 to 6.0 mol %, more preferably 0.1 to 2.0 mol %, most preferably 0.1 to 1.0 mol %, of polyolefinically unsaturated monomers.

The mixture of the olefinically unsaturated monomers contains preferably 0.1 to 6.0 mol %, more preferably 0.1 to 2.0 mol %, most preferably 0.1 to 2.0 mol %, of allyl methacrylate. More preferably, apart from allyl methacrylate, no further polyolefinically unsaturated monomers are present in the mixture.

The mixture of olefinically unsaturated monomers contains preferably <10.0% by weight, more preferably <5.0% by weight, of vinylaromatic hydrocarbons, based on the total amount of olefinically unsaturated monomers. Most preferably no vinylaromatic hydrocarbons are present in the mixture of olefinically unsaturated monomers.

In a preferred embodiment, the mixture of olefinically unsaturated monomers contains:
  98.0 to 99.5% by weight of one or more monounsaturated esters of (meth)acrylic acid having unsubstituted alkyl radicals, where the alkyl radicals have a length of 1-10 carbon atoms, and
  0.5 to 2.0% by weight of one or more polyunsaturated esters of (meth)acrylic acid,
based in each case on the total amount of olefinically unsaturated monomers.

Preferably, at least one solvent is added to the mixture of olefinically unsaturated monomers, the solvent being miscible in any ratio with water and in any ratio with the mixture of olefinically unsaturated monomers. Particularly suitable solvents are N-methylpyrrolidone, N-ethylpyrrolidone and ether alcohols, such as especially methoxypropanol.

As a result of the preparation process described, the copolymers in the inventive aqueous dispersion have a core-shell structure which can be achieved through the preparation process specified. This core-shell structure is characterized by a core comprising at least one polyurethane, and a shell comprising at least a polymer which has been obtained by polymerization of olefinically unsaturated monomers.

The core-shell structure described is achieved through the specific reaction conditions of the starved feed polymerization. Over the entire duration of the reaction, no great amounts of olefinically unsaturated monomers which could penetrate into the polyurethane particles are present in the presence of the initial charge of polyurethane. By virtue of the constant presence of free radicals during the addition of monomer in the aqueous phase, which are provided by the water-soluble initiator, oligomers are formed immediately on addition, which can no longer penetrate into the polyurethane. These then polymerize on the surface of the polyurethane.

In a preferred embodiment, the weight ratio of core to shell is 80:20 to 20:80, more preferably 60:40 to 40:60.

The microstructure of the copolymers can be examined by transmission electron microscopy: for this purpose, it is necessary to incorporate structures which can be made amenable to contrasting, preferably by means of heavy metal compounds, into the polymer. This is preferably accomplished during the free-radical copolymerization by the incorporation of polydiene sequences into the copolymer, preference being given to copolymerizing isoprene or butadiene with olefinically unsaturated compounds and allyl compounds.

For analysis, a polymer film has to be formed from the aqueous dispersion, which, after contrasting in an osmium or ruthenium tetroxide-enriched atmosphere, can be examined by electron microscopy.

The copolymers preferably have a particle size (z average) of 60 to 130 nm, more preferably of 70 to 115 nm, measured by means of photon correlation spectroscopy with a Malvern Nano S90 (from Malvern Instruments) at 25±1° C. The unit, equipped with a 4 mW He—Ne laser at a wavelength of 633 nm, covers a size range from 1 to 3000 nm.

The copolymers may be crosslinked. The gel content of the inventive aqueous dispersion is preferably 40 to 97% by weight, more preferably 75 to 90% by weight, based in each case on the solids in the dispersion.

The gel content can be determined gravimetrically, by freeze-drying the dispersion, determining the total mass of the freeze-dried polymer and then extracting the polymer in an excess of tetrahydrofuran (ratio of tetrahydrofuran to freeze-dried polymer=300:1) at 25° C. for 24 hours. The insoluble fraction is removed and dried in an air circulation oven at 50° C. for 4 hours. Thereafter, the dried insoluble fraction is weighed and the quotient is formed with the total mass of the freeze-dried polymer. The value obtained corresponds to the gel content.

The weight-average molar mass of the copolymers is preferably $3*10^7$ g/mol to $8.5*10^9$ g/mol, the weight-average molar mass being determinable by small-angle laser light scattering.

The acid number of the copolymers is 0 to 220 mg KOH/g solid resin, preferably 0 to 40 mg KOH/g solid resin, more preferably 0 to 25 mg KOH/g solid resin. The OH number is less than 70 and preferably less than 20 mg KOH/g solid resin.

The acid number can be determined based on DIN EN ISO 2114 in homogeneous solution from THF/water (9 parts by volume of THF and 1 part by volume of distilled water) with ethanolic potassium hydroxide solution.

The OH number can be determined based on R.-P. Krüger, R. Gnauck and R. Algeier, Plaste und Kautschuk, 20, 274 (1982), by means of acetic anhydride in the presence of 4-dimethylaminopyridine as a catalyst in a tetrahydrofuran (THF)/dimethylformamide (DMF) solution at room temperature, with full hydrolysis of the remaining excess of acetic anhydride after acetylation and potentiometric back-titration of the acetic acid with alcoholic potassium hydroxide solution.

It is advantageous to use the inventive dispersion for production of coating materials, especially for production of base coats.

The present application further relates to a waterborne basecoat comprising an inventive dispersion.

The waterborne basecoat generally comprises coloring pigments and/or optical effect pigments.

Such color pigments and effect pigments are described to the person skilled in the art, for example, in Römpp-Lexikon Lacke und Druckfarben [Römpp Dictionary of Coating Materials and Printing Inks], Georg Thieme Verlag, Stuttgart, N.Y., 1998, pages 176 and 451.

Effect pigments are, for example, metal effect pigments, for example aluminum pigments, gold bronzes, oxidized bronzes and/or iron oxide-aluminum pigments, pearlescent pigments, for example pearl essence, basic lead carbonate, bismuth oxide chloride and/or metal oxide-mica pigments and/or other effect pigments, for example micronized titanium dioxide, lamellar graphite, lamellar iron oxide, multilayer effect pigments composed of PVD films and/or liquid crystal polymer pigments.

The proportion of the pigments is preferably in the range from 1.0 to 40.0% by weight, preferably 2.0 to 20.0% by weight, more preferably 5.0 to 15.0% by weight, based on the total weight of the pigmented waterborne basecoat.

The inventive basecoat may comprise binders curable physically, thermally or thermally and with actinic radiation.

In the context of the present invention, the term "physical curing" means the formation of a film by release of solvents from polymer solutions or polymer dispersions. Typically, no crosslinking agents are needed for this purpose.

In the context of the present invention, the term "thermal curing" means the heat-initiated crosslinking of a coating material layer, in which either a crosslinking agent present separately or else self-crosslinking binders are employed in the underlying coating material. The crosslinking agent contains reactive functional groups complementary to the reactive functional groups present in the binders. This is typically referred to by specialists as external crosslinking. If the complementary reactive functional groups or autoreactive functional groups, i.e. groups which react with groups of the same kind, are already present in the binder molecules, self-crosslinking binders are present. Examples of suitable complementary reactive functional groups and autoreactive functional groups are known from German patent application DE 199 30 665 A1, page 7 line 28 to page 9 line 24.

In the context of the present invention, actinic radiation is understood to mean electromagnetic radiation such as near infrared (NIR), UV radiation, especially UV radiation, and corpuscular radiation such as electron beams. The curing by UV radiation is typically initiated by free-radical or cationic photoiniators.

If thermal curing and curing with actinic radiation are employed together, reference is also made to "dual cure".

In the present invention, preference is given to basecoats curable thermally or thermally and with actinic radiation, i.e. by means of dual curing.

Especially preferred are those basecoats which comprise a polyurethane resin as a binder and an amino resin or a blocked or unblocked polyisocyanate, preferably an amino resin, as a crosslinking agent. Among the amino resins, preference is given especially to melamine resins.

Preferably, a thickener is additionally present. Suitable thickeners are inorganic thickeners from the group of the sheet silicates. Particularly suitable are lithium-aluminum-magnesium silicates.

As well as the inorganic thickeners, however, it is also possible to use one or more organic thickeners. These are preferably selected from the group consisting of (meth) acrylic acid (meth)acrylate copolymer thickeners, for example the commercial product Viscalex HV30 (Ciba, BASF) and polyurethane thickeners, for example the commercial product DSX® 1550 from Cognis. (Meth)acrylic acid-(meth)acrylate copolymer thickeners refer to those which, as well as acrylic acid and/or methacrylic acid, also contain one or more acrylic esters (i.e. acrylates) and/or one or more methacrylic esters (i.e. methacrylates). A feature common to the (meth)acrylic acid-(meth)acrylate copolymer thickeners is that they exhibit a significant viscosity rise in alkaline medium, i.e. at pH values>7, especially >7.5, through salt formation of acrylic acid and/or methacrylic acid, i.e. through the formation of carboxylate groups. If (meth)acrylic esters which are formed from (meth)acrylic acid and a $C_1$-$C_6$-alkanol are used, what are obtained are essentially non-associative (meth)acrylic acid-(meth)acrylate copolymer thickeners, for example the abovementioned Viscalex HV30. Essentially nonassociative (meth)acrylic acid-(meth)acrylate copolymer thickeners are also referred to in the literature as ASE thickeners ("alkali soluble/swellable emulsion"). However, usable (meth)acrylic acid-(meth)acrylate copolymer thickeners also include what are called HASE thickeners ("Hydrophobically Modified Anionic Soluble Emulsions"). These are obtained when the alkanols used, instead of or in addition to the $C_1$-$C_6$-alkanols, are those having a greater number of carbon atoms, for example 7 to 30, or 8 to 20, carbon atoms. HASE thickeners have essentially associative thickening action. The (meth)acrylic acid-(meth)acrylate copolymer thickeners usable are unsuitable as binder resins because of their thickening properties; they are thus not included among the physically, thermally or thermally and actinically curable binders refer to as binders, and are thus explicitly different from the poly(meth)acrylate-based binders which can be used in the inventive basecoat compositions. Polyurethane thickeners are understood to mean the associative thickeners referred to in the literature as HEUR ("Hydrophobically Modified Ethylene Oxide Urethane Rheology Modifiers"). In chemical terms, these are nonionic branched or unbranched block copolymers formed from polyethylene oxide chains (sometimes also polypropylene oxide chains) which are bonded to one another via urethane bonds and which bear terminal long-chain alkyl or alkylene groups having 8 to 30 carbon atoms. Typical alkyl groups are, for example, dodecyl or stearyl groups, a typical alkenyl group is, for example an oleyl group, a typical aryl group is the phenyl group, and a typical alkylated aryl group is, for example, a nonylphenyl group. Because of their thickening properties and structure, the polyurethane thickeners are not suitable as physically, thermally or thermally and physically curable binder resins. They are thus explicitly different than the polyurethanes which can be used as binders in the inventive basecoat compositions.

In addition, the waterborne basecoat may comprise at least one additive. Examples of such additives are salts decomposable thermally without residue or essentially without residue, physically, thermally and/or actinic radiation-curable resins other than polyurethane resins as binders, further crosslinking agents, organic solvents, reactive diluents, transparent pigments, fillers, dyes soluble in molecular dispersion, nanoparticles, light stabilizers, antioxidants, deaerating agents, emulsifiers, slip additives, polymerization inhibitors, initiators for free-radical polymerizations, adhesion promoters, leveling agents, film-forming assistants, sag control agents (SCAB), flame retardants, corrosion inhibitors, waxes, siccatives, biocides and matting agents.

Suitable additives of the aforementioned type are known, for example, from

German patent application DE 199 48 004 A1, page 14 line 4 to page 17 line 5,

German patent DE 100 43 405 C1, column 5, paragraphs [0031] to [0033].

They are used in the customary and known amounts.

The solids content of the basecoats used in accordance with the invention can vary according to the requirements of the individual case. Primarily, the solids content is guided by the viscosity required for the application, especially spray application, and so it can be adjusted by the person skilled in the art on the basis of his general specialist knowledge, optionally with the aid of a few exploratory tests.

The solids content of the basecoats is preferably 5 to 70% by weight, more preferably 10 to 65% by weight and especially preferably 15 to 60% by weight.

The solids content is understood to mean that proportion by weight which remains as a residue on evaporative concentration under fixed conditions. The solids are determined to DIN EN ISO 3251 at 130° C., 60 min, starting weight 1.0 g.

The basecoats used in accordance with the invention can be produced using the mixing processes and mixing units customary and known for the production of basecoats.

The inventive basecoats can be employed as one-component (1K), two-component (2K) or multicomponent (3K, 4K) systems. Preference is given to (1K) systems.

In one-component (1K) systems, binder and crosslinking agent are present alongside one another, i.e. in one component. A prerequisite for this is that the two components crosslink with one another only at relatively high temperatures and/or when irradiated with actinic radiation.

In two-component (2K) systems, for example, binder and crosslinking agent are present separately in at least two components which are only combined shortly before application. This form is selected when binder and crosslinking agent already react with one another at room temperature. Coating materials of this kind are used particularly for coating of thermally sensitive substrates, especially in automotive refinishing.

The pigmented waterborne basecoat used in accordance with the invention can be applied to a substrate in the layer thicknesses customary within the automotive industry, in the range from, for example, 5 to 100 micrometers, preferably 5 to 60 micrometers (layer thickness after baking operation). This involves employing, for example, the known methods such as spraying, bar coating, painting, pouring, dipping, impregnating, trickling or rolling. Preference is given to employing spray application methods, such as compressed air spraying, airless spraying, high-speed rotation, electrostatic spray application (ESTA), optionally combined with hot spray application, for example hot air spraying.

After the pigmented waterborne basecoat has been applied, it can be dried by known methods. For example, (1K) basecoats can be flashed off at room temperature for 1 to 60 minutes and subsequently preferably dried at optionally slightly elevated temperatures of 30 to 80° C. Flashing-off and drying are understood in the context of the present invention to mean vaporization of organic solvents and/or water, as a result of which the coating material becomes drier but is not cured, or no fully crosslinked coating material film has yet formed.

Then a standard commercial clearcoat is applied by likewise standard methods, the dry layer thicknesses again being within the standard ranges, for example 5 to 100 micrometers. Such clearcoats are known to those skilled in the art.

After the application of the clearcoat, it can be flashed off at room temperature, for example for 1 to 60 minutes, and optionally dried. Then the clearcoat is cured together with the pigmented basecoat applied. In the course of this, for example, crosslinking reactions take place, which produces an inventive multicoat color and/or effect paint system on a substrate. The curing is preferably effected thermally or thermally and with actinic radiation at temperatures of 20 to 200° C.

A further aspect of the present invention is a method for producing a multicoat color and/or effect paint system, in which (a) a pigmented waterborne basecoat is applied to a substrate, (b) a polymer film is formed from the coating material applied in stage (a), (c) a clearcoat is applied to the basecoat layer thus obtained and then (d) the basecoat layer is cured together with the clearcoat layer, which comprises using, in stage (a), a pigmented waterborne basecoat, said basecoat comprising an inventive dispersion.

All details given above with regard to the inventive dispersion and the waterborne basecoat also apply to the inventive use and to the method according to the invention. This particularly also applies to all preferred, particularly preferred and very particular preferred features.

Advantageously, the inventive waterborne basecoat can be used for coating of automobile bodies and/or plastic parts for installation on automobile bodies.

With the aid of the method according to the invention, it is possible to paint metallic and nonmetallic substrates, especially plastic substrates, preferably automobile bodies or parts thereof.

The invention is illustrated hereinafter by examples.

EXAMPLES

Unless stated otherwise, the hydroxyl number in the examples which follow was determined based on R.-P. Krüger, R. Gnauck and R. Algeier, Plaste and Kautschuk, 20, 274 (1982), by means of acetic anhydride in the presence of 4-dimethylaminopyridine as catalyst in a tetrahydrofuran (THF)/dimethylformamide (DMF) solution at room temperature, with full hydrolysis of the remaining excess of acetic anhydride after acetylation and potentiometric back-titration of the acetic acid with alcoholic potassium hydroxide solution. Acetylation times of 60 min were sufficient in all cases to guarantee a full conversion.

Unless stated otherwise, the acid number in the examples which follow was determined based on DIN EN ISO 2114 in homogeneous solution from THF/water (9 parts by volume of THF and 1 part by volume of distilled water) with ethanolic potassium hydroxide solution.

Unless stated otherwise, solids content, also referred to hereinafter as solids, was determined in the examples which follow to DIN EN ISO 3251 at 130°; 60 min, starting weight 1.0 g.

The number-average molar mass ($M_n$) in the examples which follow, unless stated otherwise, was determined by means of a 10.00 vapor pressure osometer (from Knauer) on concentration series in toluene at 50° C. according to E. Schröder, G. Müller, K.-F. Arndt, "Leitfaden der Polymercharakterisierung" [Guidelines for Polymer Characterization], Akademie-Verlag, Berlin, p. 47-54, 1982.

Polyurethane Dispersions

Example D-P1

Preparation of a Dispersion of an Unsaturated Polyesterurethane Having Alpha-Methylstyryl Groups A dispersion of an alpha-methylstyryl-containing polyurethane was produced based on the patent specification DE 19948004 B4, page 27, example 1, "Herstellung eines erfindungsgemäßen Polyurethans (B)" [Preparation of an inventive polyurethane (B)], except that the solids in the resulting dispersion were only 29% rather than 35% by weight. Based on the adduct (B2) mentioned in the patent specification DE 19948004 B4, preparation example 1, an adduct was prepared with monoethanolamine and trimethylolpropane rather than with diethanolamine:

For this purpose, a reaction vessel equipped with stirrer, internal thermometer, reflux condenser and electrical heater was first charged under nitrogen with 200.0 parts by weight of methyl ethyl ketone, 800.0 parts by weight of N-methylpyrrolidone and 221.3 parts by weight of monoethanolamine (from BASF SE) at 20° C. Added dropwise to this mixture over the course of one and a half hours were 778.7 parts by weight of 1-(1-isocyanato-1-methylethyl)-3-(1-methylethenyl)benzene (TMI® (META) Unsaturated Aliphatic Isocyanate, from Cytec) having an isocyanate content of 20.4% by weight of isocyanate, in such a way that the reaction temperature of 40° C. was not exceeded. The resulting reaction mixture was stirred until no free isocyanate groups were detectable any longer. Thereafter, the reaction mixture was stabilized with 200 ppm of hydroquinone.

The theoretical solids content of the thus produced solution of the adduct described was 50% by weight.

Then, in a further reaction vessel equipped with stirrer, internal thermometer, reflux condenser and electrical heater, 431.7 parts by weight of a linear polyester polyol and 69.7 parts by weight of dimethylolpropionic acid (from GEO Speciality Chemicals) were dissolved in 355.8 parts by weight of methyl ethyl ketone and 61.6 parts by weight of N-methylpyrrolidone under nitrogen. The linear polyester polyol had been prepared beforehand from dimerized fatty acid (Pripol® 1012, from Uniqema), isophthalic acid (from BP Chemicals) and hexane-1,6-diol (from BASF SE) (weight ratio of the starting materials: dimeric fatty acid to isophthalic acid to hexane-1,6-diol=54.00:30.02:15.98) and had a hydroxyl number of 73 mg KOH/g solids and a number-average molar mass of 1379 g/mol.

To the resulting solution were added, at 45° C., 288.6 parts by weight of isophorone diisocyanate (Basonat® I, from BASF SE) having an isocyanate content of 37.75% by weight. After the exothermic reaction had abated, the reaction mixture was heated gradually to 80° C. while stirring. Stirring was continued at this temperature until the isocyanate content of the solution was 3.2% by weight and was constant. Thereafter, the reaction mixture was cooled to 65° C., and 85.2 parts by weight of the above-described adduct were added together with 21.8 parts by weight of trimethylolpropane (from BASF SE). The resulting reaction mixture was stirred at 65° C. until the isocyanate content of the solution had fallen to 1.0% by weight. Now 22.2% by weight of diethanolamine (from BASF SE) were added and the content of isocyanate groups was monitored until no free isocyanate groups were detectable any longer. The resulting dissolved polyurethane was admixed with 139.7 parts by weight of methoxypropanol and 43.3 parts by weight of triethylamine (from BASF SE). 30 minutes after the addition of amine, the temperature of the solution was lowered to 60° C., and then 1981 parts by weight of deionized water were added while stirring over the course of 30 minutes. The methyl ethyl ketone was distilled out of the resulting dispersion at 60° C. under reduced pressure. Thereafter, any losses of solvent and water were compensated.

The dispersion of an alpha-methylstyryl-containing polyurethane thus obtained had a solids content of 29.0% by weight; the acid number was 34.0 mg KOH/g solids content and the pH was 7.0 (measured at 23° C.)

Example D-P2

Preparation of a Dispersion of a Saturated Polyesterurethane Having Isotridecyl Groups As in comparative example DP-1, a polyurethane dispersion was prepared, except that it had not alpha-methylstyryl groups but isotridecyl groups.

In a reaction vessel equipped with stirrer, internal thermometer, reflux condenser and electrical heater, 440.1 parts by weight of a linear polyester polyol prepared from dimerized fatty acid (Pripol® 1012, from Uniqema), isophthalic acid (from BP Chemicals) and hexane-1,6-diol (BASF SE) (weight ratio of the starting materials: dimeric fatty acid to isophthalic acid to hexane-1,6-diol=54.00: 30.02:15.98), having a hydroxyl number of 73 mg KOH/g solids and a number-average molar mass of 1379 g/mol, and also 71.1 parts by weight of dimethylolpropionic acid (from GEO Speciality Chemicals), were dissolved in 362.7 parts by weight of methyl ethyl ketone and 62.8 parts by weight of N-methylpyrrolidone under nitrogen. Added to the resulting solution at 45° C. were 294.3 parts by weight of isophorone diisocyanate (Basonat® I, from BASF SE) having an isocyanate content of 37.75% by weight. After the exothermic reaction had abated, the reaction mixture was heated gradually to 80° C. while stirring. Stirring was continued at this temperature until the isocyanate content of the solution was 3.2% by weight and was constant. Thereafter, the reaction mixture was cooled to 70° C., and 33.1 parts by weight of isotridecyl alcohol (Isotridecanol N, from BASF SE) were added together with 19.3 parts by weight of trimethylolpropane (from BASF SE) and 25.6 parts by weight of methyl ethyl ketone. The resulting reaction mixture was stirred at 70° C. until the isocyanate content of the solution had fallen to 0.8% by weight. Now 19.6% by weight of diethanolamine (from BASF SE) was added and the content of isocyanate groups was monitored until no free isocyanate groups were detectable any longer. The resulting dissolved polyurethane was admixed with 123 parts by weight of methoxypropanol and 43.8 parts by weight of triethylamine (from BASF SE). 30 minutes after the addition of amine, the temperature of the solution was lowered to 60° C., and then, after 30 minutes, 2009 parts by weight of deionized water were added while stirring. The methyl ethyl ketone was distilled out of the resulting dispersion at 60° C. under reduced pressure. Thereafter, any losses of solvent and water were compensated.

The polyurethane dispersion thus obtained had a solids content of 29.0% by weight; the acid number was 34.1 mg KOH/g solids content and the pH was 7.0 (measured at 23° C.)

Example D-P3

Production of a Dispersion of a Saturated Polyetherurethane with Polytetramethylene Oxide Segments In a reaction vessel equipped with stirrer, internal thermometer, reflux condenser and electrical heater, 685.8 parts by weight of a linear alpha,omega-hydroxy-terminated polytetramethylene oxide (PolyTHF® 2000, from BASF SE) having a hydroxyl number of 56.1 mg KOH/g solids and a number-average molecular weight of 2000 g/mol, 138.0 parts by weight of dimethylolpropionic acid (from GEO Speciality Chemicals), 0.01 part by weight of dibutyltin dilaurate and 685.8 parts by weight of methyl ethyl ketone were dissolved under nitrogen at 70° C. To the resulting solution were added 418.8 parts by weight of m-tetramethylxylene diisocyanate (TMXDI® (Meta) Aliphatic Isocyanate, from Cytec) having an isocyanate content of 34.4% by weight. Subsequently, the reaction mixture was heated gradually to 80° C. while stirring and kept at this temperature until the isocyanate content of the solution was 1.8% by weight and was constant. Thereafter, 87.4 parts by weight of trimethylolpropane (from BASF SE) and 26.1 parts by weight of methyl ethyl ketone were added rapidly to the reaction mixture. The resulting reaction mixture was stirred at 80° C. until no free isocyanate groups were detectable any longer. The resulting dissolved polyurethane was admixed with 41.2 parts by weight of dimethylethanolamine and stirred for a further 60 minutes. Thereafter, the reaction mixture was transferred fully while stirring constantly over the course of 30 minutes into a second reaction vessel which had already been initially charged with 1732 parts by weight of deionized water which had been warmed beforehand to 70° C. The methyl ethyl ketone was distilled out of the resulting dispersion at 60° C. under reduced pressure. Thereafter, any losses of water were compensated.

The polyurethane dispersion thus obtained had a solids content of 38.0% by weight; the acid number was 43.0 mg KOH/g solids content and the pH was 6.2 (measured at 23° C.)

Example D-P4

Production of a Known Dispersion of a Sulfur-Containing Saturated Polyesterurethane According to EP1330480B1, the polyester polyol according to preparation example 1, page 15, was used to prepare a polyurethane prepolymer according to preparation example 2, page 15, which was reacted with thiodiethanol according to example 1, page 16 "Die Herstellung eines erfindungsgemäßen Polyurethans und einer wässrigen Dispersion hiervon" [the preparation of an inventive polyurethane and an aqueous dispersion thereof], neutralized with triethylamine and then converted to an aqueous polyurethane dispersion. The methyl ethyl ketone was distilled out of the resulting dispersion at 60° C. under reduced pressure. Thereafter, any losses of water were compensated.

The dispersion of a sulfur-containing polyurethane obtained in this way had a solids content of 27.3% by weight; the acid number was 34.4 mg KOH/g solids content, the neutralization level was 84% and the pH was 7.1 (measured at 23° C.)

Polyurethane-Polyacrylate Copolymer Dispersions

Example D-A1

Preparation of a Primary Dispersion of a Polyesterurethane-Polyacrylate Copolymer, Proceeding from an Unsaturated Polyesterurethane Having Alpha-Methylstyryl Groups Based on patent specification DE 19948004 B4, page 27, example 2, "Die Herstellung der Primärdispersion eines erfindungsgemäßen Mischpolymerisats 1" [The preparation of the primary dispersion of an inventive copolymer 1], and patent specification EP1218434 B1, page 24, example 2, "Die Herstellung der Primärdispersion eines erfindungsgemäßen Pfropfmischpolymerisats 1" under a nitrogen atmosphere, 1937.8 parts by weight of the polyurethane dispersion according to example DP-1 were diluted with 856.9 parts by weight of deionized water and heated to 85° C. At this temperature, under standard pressure, a mixture of 160.7 parts by weight of styrene, 160.7 parts by weight of methyl methacrylate, 120.3 parts by weight of n-butyl acrylate and 120.3 parts by weight of hydroxyethyl methacrylate was added homogeneously to the dispersion while stirring over the course of 3.5 hours. With commencement of the addition of the monomer mixture, a solution of 8.4 parts by weight of tert-butyl peroxyethylhexanoate in 134.9 parts by weight of methoxypropanol was added within 4 hours. The resulting reaction mixture was stirred at 85° C. until all monomers had reacted (total monomer content (GC) based on dispersion<0.1%).

During the free-radical polymerization, at intervals of 30 minutes, the content of free monomers was determined by means of gas chromatography (GC) (GC: 50 m silica capillary column with polyethylene glycol phase or 50 m silica capillary column with polydimethylsiloxane phase, helium carrier gas, split injector 150° C., oven temperature 40-220° C., flame ionization detector, detector temperature 275° C., isobutyl acrylate internal standard), and the highest total monomer content based on dispersion was determined after 30 min at 1.8% by weight (11.1% by weight based on vinyl monomer).

The resulting primary dispersion of the copolymer had, as described in the original example, very good storage stability. The solids content thereof was 32.5% by weight, the acid number was 18.3 mg KOH/g solids content and the pH thereof was 7.2 (measured at 23° C.). The particle size (z average) by means of photon correlation spectroscopy was 104 nm. By means of gas chromatography (GC: 50 m silica capillary column with polyethylene glycol phase or 50 m silica capillary column with polydimethylsiloxane phase, helium carrier gas, split injector 250° C., oven temperature 40-220° C., flame ionization detector, detector temperature 275° C., n-propyl glycol internal standard), a content of 6.0% by weight of methoxypropanol and 1.7% by weight of n-methylpyrrolidone was determined.

After extraction of the freeze-dried polymer by means of tetrahydrofuran, the gel content was determined gravimetrically to be 71.5% by weight. For this purpose, the dispersion was freeze-dried, the mass of the freeze-dried polymer was determined, and the polymer was then extracted at 25° C. in an excess of tetrahydrofuran (ratio of tetrahydrofuran to freeze-dried copolymer=300:1) for 24 hours. The insoluble content (gel content) was isolated, dried at 50° C. in an air circulation oven for 4 hours, and then reweighed.

Example D-A2

Preparation of a Primary Dispersion of a Polyesterurethane-Polyacrylate Copolymer, Proceeding from a Saturated Polyesterurethane Having Isotridecyl Groups Analogously to preparation example D-A1, a primary dispersion was prepared with exchange of the polyurethane dispersion having alpha-methylstyryl groups according to preparation example D-P1 for the same weight of the polyurethane dispersion having isotridecyl groups prepared according to preparation example D-P2.

During the free-radical polymerization, at intervals of 30 minutes, the content of free monomers was determined by means of gas chromatography analogously to example D-A1, and the highest total monomer content based on dispersion was determined after 30 min to be 2.0% by weight (12.4% by weight based on vinyl monomer).

The resulting primary dispersion of the copolymer had a very good storage stability. The solids content thereof was 32.2% by weight, the acid number was 18.1 mg KOH/g solids content and the pH thereof was 7.3 (measured at 23° C.). The particle size (z average) by means of photon correlation spectroscopy was 112 nm. Analogously to example D-A1, by means of gas chromatography, a content of 5.7% by weight of methoxypropanol and 1.2% by weight of N-methylpyrrolidone was determined.

Analogously to example D-A1, the gel content was determined gravimetrically after extraction by means of tetrahydrofuran to be 70.2% by weight.

Example D-A3

Preparation of a Primary Dispersion of a Polyesterurethane-Polyacrylate Copolymer (Isoprene Comonomer), Proceeding from an Unsaturated Polyesterurethane Having Alpha-Methylstyryl Groups As in preparation example D-A1, a primary dispersion of a copolymer was prepared, except that 15 mol % of the vinylic monomers were exchanged for isoprene: thus, 1937.8 parts by weight of the polyurethane dispersion according to preparation example D-P1 were diluted with 857.0 parts by weight of deionized water and heated to 85° C. At this temperature, a mixture of 145.2 parts by weight of styrene, 145.2 parts by weight of methyl methacrylate, 108.7 parts by weight of n-butyl acrylate, 108.7 parts by weight of hydroxyethyl methacrylate and 54.3 parts by weight of isoprene was added homogeneously to the dispersion while stirring under gauge nitrogen pressure 3 bar over the course of 3.5 hours. With commencement of the addition of the monomer mixture, a solution of 8.4 parts by weight of tert-butyl peroxyethylhexanoate in 134.9 parts by weight of methoxypropanol was added within four hours. The resulting reaction mixture was stirred for longer at 85° C. until all monomers had reacted.

The resulting primary dispersion had a very good storage stability. The solids content thereof was 32.3% by weight, the acid number was 18.3 mg KOH/g and the pH thereof was 7.2 (measured at 23° C.). The particle size (z average) by means of photon correlation spectroscopy was 115 nm. Analogously to example D-A1, by means of gas chromatography, a content of 6.0% by weight of methoxypropanol and 1.7% by weight of N-methylpyrrolidone was determined.

Analogously to example D-A1, the gel content was determined gravimetrically after extraction by means of tetrahydrofuran to be 70.8% by weight.

Example D-A4

Preparation of a Primary Dispersion of a Polyesterurethane-Polyacrylate Copolymer (without Styrene Comonomer), Proceeding from an Unsaturated Polyesterurethane Having Alpha-Methylstyryl Groups As in preparation example D-A1, a primary dispersion of a copolymer was prepared, except that the proportion of styrene was replaced by the same weight of methyl methacrylate and the solids content was lowered to 28%:

Thus, under a nitrogen atmosphere, 1689.6 parts by weight of the polyurethane dispersion were diluted with 1133.5 parts by weight of deionized water and 142.4 parts by weight of N-methylpyrrolidone, and heated to 85° C. At this temperature, under standard pressure, a mixture of 280.3 parts by weight of methyl methacrylate, 104.9 parts by weight of n-butyl acrylate and 104.9 parts by weight of hydroxyethyl methacrylate was added homogeneously to the dispersion while stirring over the course of 3.5 hours. With commencement of the addition of the monomer mixture, a solution of 7.4 parts by weight of tert-butyl peroxyethylhexanoate in 37.0 parts by weight of methoxypropanol was added within four hours. The resulting reaction mixture was stirred for longer at 85° C. until all monomers had reacted.

During the free-radical polymerization, at intervals of 30 minutes, the content of free monomers was determined analogously to example D-A1 by means of gas chromatography, and the highest total monomer content based on dispersion was determined after 30 min to be 1.0% by weight (7.1% by weight based on vinyl monomer).

The resulting primary dispersion of the copolymer had, like the styrene-containing dispersion, very good storage stability. The solids content thereof was adjusted to 28.0% by weight; the acid number was 18.1 mg KOH/g solids content and the pH thereof was 7.2 (measured at 23° C.). The particle size (z average) by means of photon correlation spectroscopy was 102 nm. Analogously to example D-A1, by means of gas chromatography, a content of 2.8% by weight of methoxypropanol and 5.8% by weight of N-methylpyrrolidone was determined. Analogously to example D-A1, the gel content was determined gravimetrically after extraction by means of tetrahydrofuran to be 72.0% by weight.

Example D-A5

Preparation of a Primary Dispersion of a Polyesterurethane-Polyacrylate Copolymer, Proceeding from a Saturated, Sulfur-Containing Polyesterurethane (Solvent-Free)

According to EP1330480B1, example 2, page 16, "Die Herstellung der Primärdispersion eines erfindungsgemäßen Polymergemischs" [The preparation of the primary dispersion of an inventive polymer mixture], 2285.8 parts by weight of the polyurethane dispersion according to example DP-4 were initially charged under nitrogen atmosphere and heated to 82° C. At this temperature, under standard pressure, a mixture of 118.8 parts by weight of styrene, 207.7 parts by weight of hydroxypropyl methacrylate, 59.8 parts by weight of n-butyl acrylate, 88.9 parts by weight of methyl methacrylate and 118.8 parts by weight of tert-butylcyclohexyl acrylate was added homogeneously to the dispersion while stirring over the course of 4 hours. With commencement of the addition of the monomer mixture, 29.9 parts by weight of tert-butyl peroxyethylhexanoate were added within 4.5 hours. After the initiator feed had ended, polymerization was continued at 82° C. for one hour. During the free-radical polymerization, at intervals of 30 minutes, the content of free monomers was determined analogously to example D-A1 by means of gas chromatography, and the highest total monomer content was determined after 30 min to be 1.6% by weight based on a 41.9% by weight dispersion (7.6% by weight based on vinyl monomer).

The resulting primary dispersion was diluted further with 590.3 parts by weight of water, so as to result in a solids content as in EP1330480B1, example 2, of 34.8% by weight.

The acid number was 19.6 mg KOH/g solids content and the pH of the dispersion was 7.4 (measured at 23° C.). The neutralization level was 80.2%. The particle size (z average) by means of photon correlation spectroscopy was 83 nm. The resulting dispersion did not contain any solvent. Analogously to example D-A1, the gel content was determined gravimetrically after extraction by means of tetrahydrofuran to be 0.0% by weight.

Example D-A6

Preparation of a Primary Dispersion of a Polyesterurethane-Polyacrylate Copolymer, Proceeding from a Saturated, Sulfur-Containing Polyesterurethane, and Addition of Methoxypropanol and N-Methylpyrrolidone Analogously to example D-A5, a copolymer was prepared.

The resulting primary dispersion having a solids content of 41.9% by weight, after the end of continued polymerization, was diluted further with 77.0 parts by weight of methoxypropanol, 206.5 parts by weight of N-methylpyrrolidone and 306.8 parts by weight of water, so as to result in a solids content of 34.8% by weight, analogously to comparative example D-A5.

The acid number was 18.5 mg KOH/g solids content and the pH thereof was 7.2 (measured at 23° C.). The neutralization level was 80.0%. The particle size (z average) by means of photon correlation spectroscopy was 81 nm. By means of gas chromatography, analogously to example D-A1, a content of 2.2% by weight of methoxypropanol and 5.9% by weight of N-methylpyrrolidone was determined. As in example D-A5, it was not possible to determine any gel content (gel content=0.0% by weight).

Example D-B1

Preparation of an Inventive Primary Dispersion of a Polyesterurethane-Polyacrylate Copolymer, Proceeding from an Unsaturated Polyesterurethane Having Alpha-Methylstyryl Groups For preparation of the primary dispersion of an inventive copolymer, under a nitrogen atmosphere, 1961.2 parts by weight of the alpha-methylstyryl-containing polyurethane dispersion according to preparation example D-P1 were diluted with 40.0 parts by weight of methoxypropanol (0.07% based on polyurethane) and 686.5 parts by weight of deionized water, and heated to 80° C. After the reactor contents had been heated to 80° C., 0.6 part by weight of ammonium peroxodisulfate dissolved in 35.7 parts by weight of deionized water was added to the reactor under standard pressure. Subsequently, while stirring continually, a mixture of 301.6 parts by weight of methyl methacrylate, 261.6 parts by weight of n-butyl acrylate, 5.6 parts by weight of allyl methacrylate (0.87 mol % based on total vinyl monomer) and 134.9 parts by weight of N-methylpyrrolidone was added homogeneously over the course of 5 hours. With commencement of the addition of the monomer mixture, a solution of 1.1 parts by weight of ammonium peroxodisulfate in 71.3 parts by weight of deionized water was likewise added within five hours.

During the free-radical polymerization, at intervals of 30 minutes, the content of free monomers was determined analogously to example D-A1 by means of gas chromatography, and the highest total monomer content based on dispersion was determined after 30 min to be 0.5% by weight (3.1% by weight based on vinyl monomer).

After the simultaneous end of the metered addition of monomer and initiator, the resulting reaction mixture was stirred at 80° C. for a further hour and then cooled to room temperature.

The resulting primary dispersion of the copolymer had a very good storage stability. The solids content thereof was 32.5%, the acid number was 18.8 mg KOH/g solids content and the pH thereof was 7.0. The particle size (z average) by means of photon correlation spectroscopy was 96 nm. Analogously to example D-A1, by means of gas chromatography, a content of 2.7% by weight of methoxypropanol and 5.7% by weight of N-methylpyrrolidone was determined.

Analogously to example D-A1, the gel content was determined gravimetrically after extraction by means of tetrahydrofuran to be 80.3% by weight.

Example D-B2

Preparation of an Inventive Primary Dispersion of a Polyesterurethane-Polyacrylate Copolymer, Proceeding from a Saturated Polyesterurethane Having Isotridecyl Groups Analogously to preparation example D-B1, a primary dispersion was prepared with exchange of the polyurethane dispersion having alpha-methylstyryl groups according to preparation example D-P1 for the same weight of the polyurethane dispersion having isotridecyl groups according to preparation example D-P2. During the free-radical polymerization, at intervals of 30 minutes, the content of free monomers was determined analogously to example D-A1 by means of gas chromatography, and the highest total monomer content based on dispersion was determined after 30 min to be 0.5% by weight (3.1% by weight based on vinyl monomer).

The resulting primary dispersion of the copolymer had very good storage stability. The solids content thereof was 32.4% by weight, the acid number was 18.4 mg KOH/g solids content and the pH thereof was 6.9 (measured at 23° C.). The particle size (z average) by means of photon correlation spectroscopy was 102 nm. Analogously to example D-A1, by means of gas chromatography, a content of 2.4% by weight of methoxypropanol and 5.1% by weight of N-methylpyrrolidone was determined.

Analogously to example D-A1, the gel content was determined gravimetrically after extraction by means of tetrahydrofuran to be 79.1% by weight.

Example D-B3

Preparation of an Inventive Primary Dispersion of a Polyesterurethane-Polyacrylate Copolymer (Isoprene Comonomer), Proceeding from an Unsaturated Polyesterurethane Having Alpha-Methylstyryl Groups As in preparation example D-B1, in accordance with the invention, a primary dispersion of a copolymer was prepared, except that 15 mol % of the vinylic monomers were exchanged for isoprene: thus, 1961.2 parts by weight of the alpha-methylstyryl-containing polyurethane dispersion according to preparation example D-P1 were diluted with 40.0 parts by weight of methoxypropanol and 686.5 parts by weight of deionized water, and heated to 80° C. At 80° C., 0.6 part by weight of ammonium peroxodisulfate dissolved in 35.7 parts by weight of deionized water was added to the reactor under gauge nitrogen pressure 3 bar. Subsequently, while maintaining the pressure and stirring continually, a mixture of 271.8 parts by weight of methyl methacrylate, 235.7 parts by weight of n-butyl acrylate, 5.9 parts by weight of allyl methacrylate (0.87 mol % based on total vinyl monomer) 55.3 parts by weight of isoprene and 134.9 parts by weight of N-methylpyrrolidone was added homogeneously over the course of six hours. With commencement of the addition of monomer mixture, a solution of 1.1 parts by weight of ammonium peroxodisulfate in 71.3 parts by weight of deionized water was likewise added within six hours. After the simultaneous end of the metered addition of monomer and initiator, the resulting reaction mixture was stirred at 80° C. for a further hour and then cooled to room temperature.

The resulting primary dispersion of the graft copolymer had a very good storage stability. The solids content thereof was 32.2% by weight, the acid number of 18.8 mg KOH/g solids content and the pH thereof was 7.0 (measured at 23° C.). The particle size (z average) by means of photon correlation spectroscopy was 97 nm. Analogously to example D-A1, by means of gas chromatography, a content of 2.8% by weight of methoxypropanol and 5.6% by weight of N-methylpyrrolidone was determined.

Analogously to example D-A1, the gel content was determined gravimetrically after extraction by means of tetrahydrofuran to be 78.0% by weight.

Example D-B4

Preparation of an Inventive Primary Dispersion of a Polyesterurethane-Polyacrylate Copolymer, Proceeding from an Unsaturated Polyesterurethane Having Alpha-Methylstyryl Groups To prepare the primary dispersion of an inventive copolymer, under a nitrogen atmosphere, 1689.7 parts by weight of the alpha-methylstyryl-containing polyurethane dispersion according to preparation example D-P1 were diluted with 40.3 parts by weight of methoxypropanol (0.08% based on polyurethane) and 993.8 parts by weight of deionized water, and heated to 80° C. Once the reactor contents had been heated to 80° C., 0.7 part by weight of ammonium peroxodisulfate dissolved in 46.1 parts by weight of deionized water was added to the reactor under standard pressure. Subsequently, while stirring continually, according to preparation example D-A4, a mixture of 277.6 parts by weight of methyl methacrylate, 103.8 parts by weight of n-butyl acrylate and 103.8 parts by weight of hydroxyethyl methacrylate, and additionally 4.8 parts by weight of allyl methacrylate (0.86 mol % based on total vinyl monomer) together with 145.7 parts by weight of N-methylpyrrolidone, was added homogeneously over the course of five hours. With commencement of the addition of the monomer mixture, a solution of 1.5 parts by weight of ammonium peroxodisulfate in 92.2 parts by weight of deionized water was likewise added within five hours.

During the free-radical polymerization, at intervals of 30 minutes, the content of free monomers was determined analogously to example D-A1 by means of gas chromatography, and the highest total monomer content based on dispersion was determined after 30 min to be 0.5% by weight (3.6% by weight based on vinyl monomer).

After the simultaneous end of the metered addition of monomer and initiator, the resulting reaction mixture was stirred at 80° C. for a further hour and then cooled to room temperature.

The resulting primary dispersion of the copolymer had a very good storage stability. The solids content thereof was 28.0% by weight, the acid number was 18.2 mg KOH/g solids content and the pH thereof was 7.0. The particle size (z average) by means of photon correlation spectroscopy was 110 nm. Analogously to example D-A1, by means of gas chromatography, a content of 2.9% by weight of methoxypropanol and 5.9% by weight of N-methylpyrrolidone was determined. Analogously to example D-A1, the gel content was determined gravimetrically after extraction by means of tetrahydrofuran to be 81.2% by weight.

Example D-B5

Preparation of an Inventive Primary Dispersion of a Polyesterurethane-Polyacrylate Copolymer, Proceeding from a Saturated, Sulfur-Containing Polyesterurethane (Solvent-Borne)

To prepare the primary dispersion of an inventive copolymer, under a nitrogen atmosphere, 2101.9 parts by weight of the polyurethane dispersion according to comparative example DP-4 were diluted with 40.1 parts by weight of methoxypropanol (0.07% based on polyurethanes) and 513.3 parts by weight of deionized water, and heated to 80° C. Once the reactor contents had been heated to 80° C., 1.1 parts by weight of ammonium peroxodisulfate dissolved in 36.4 parts by weight of deionized water were added to the reactor under standard pressure. Subsequently, while stirring continually, according to comparative examples D-A5 and D-A6, a mixture of 108.3 parts by weight of styrene, 189.4 parts by weight of hydroxypropyl methacrylate, 54.6 parts by weight of n-butyl acrylate, 81.1 parts by weight of methyl methacrylate, 108.3 parts by weight of tert-butylcyclohexyl acrylate and additionally 4.5 parts by weight of allyl methacrylate (0.87 mol % based on total vinyl monomer) together with 186.0 parts by weight of N-methylpyrrolidone was added homogeneously over the course of five hours. With commencement of the addition of the monomer mixture, a solution of 2.2 parts by weight of ammonium peroxodisulfate in 72.8 parts by weight of deionized water was likewise added within five hours. During the free-radical polymerization, at intervals of 30 minutes, the content of free monomers was determined analogously to the previous example by means of gas chromatography, and the highest total monomer content based on dispersion was determined after 30 min to be 0.6% by weight (3.7% by weight based on vinyl monomer).

After the simultaneous ends of the metered addition of monomer and initiator, the resulting reaction mixture was stirred at 80° C. for a further hour and then cooled to room temperature.

The resulting primary dispersion of the copolymer had good storage stability. The solids content thereof was 33.0% by weight, the acid number was 20.1 mg KOH/g solids content and the pH thereof was 7.0. The particle size (z average) by means of photon correlation spectroscopy was 72 nm. Analogously to example D-A1, by means of gas chromatography, a content of 2.1% by weight of methoxypropanol and 6.0% by weight of N-methylpyrrolidone was determined.

Analogously to example D-A1, the gel content was determined gravimetrically after extraction by means of tetrahydrofuran to be 42.1% by weight.

Example D-C1

Preparation of an Inventive Primary Dispersion of a Polyetherurethane-Polyacrylate Copolymer, Proceeding from a Saturated Polyetherurethane To prepare the primary dispersion of an inventive copolymer, under a nitrogen atmosphere, 1496.7 parts by weight of a polytetramethylene oxide-containing polyurethane dispersion according to preparation example D-P3 were diluted with 40.0 parts by weight of methoxypropanol (0.07% based on polyurethane) and 1150.9 parts by weight of deionized water, and heated to 80° C. Once the reactor contents had been heated to 80° C., 0.6 part by weight of ammonium peroxodisulfate dissolved in 35.7 parts by weight of deionized water was added to the reactor under standard pressure. Subsequently, while stirring continually, a mixture of 301.6 parts by weight of methyl methacrylate, 261.6 parts by weight of n-butyl acrylate, 5.6 parts by weight of allyl methacrylate (0.87 mol %) and 134.9 parts by weight of N-methylpyrrolidone was added homogeneously over the course of six hours. With commencement of the addition of the monomer mixture, a solution of 1.1 parts by weight of ammonium peroxodisulfate in 71.3 parts by weight of deionized water was likewise added within six hours. After the simultaneous end of the metered addition of monomer and initiator, the resulting reaction mixture was stirred at 80° C. for a further hour and then cooled to room temperature.

The resulting primary dispersion of the copolymer had very good storage stability. The solids content thereof was 32.8% by weight, the acid number was 23.2 mg KOH/g solids content and the pH thereof was 6.2. Analogously to example D-A1, by means of gas chromatography, a content of 1.1% by weight of methoxypropanol and 3.9% by weight of N-methylpyrrolidone was determined. The particle size (z average) by means of photon correlation spectroscopy was 103 nm. Analogously to example D-A1, the gel content was determined gravimetrically after extraction by means of tetrahydrofuran to be 85.2% by weight.

Transmission Electron Microscopy on Unpigmented Polymer Films of Isoprene-Containing Polyurethane-Polyacrylate Copolymers To examine the morphology, free films of the primary dispersions were produced, and these were contrasted by means of osmium tetroxide and examined with the aid of a transmission electron microscope.

For this purpose, one drop of the primary dispersion in each case was added to 10 ml of deionized water and stirred well. Subsequently, the surface of a copper grid was used to take up one drop of the highly diluted primary dispersion thus formed, and the polymer film was dried under high vacuum. This was followed by the contrasting of the film in an osmium tetroxide-enriched atmosphere in a closed vessel.

Figure 1:
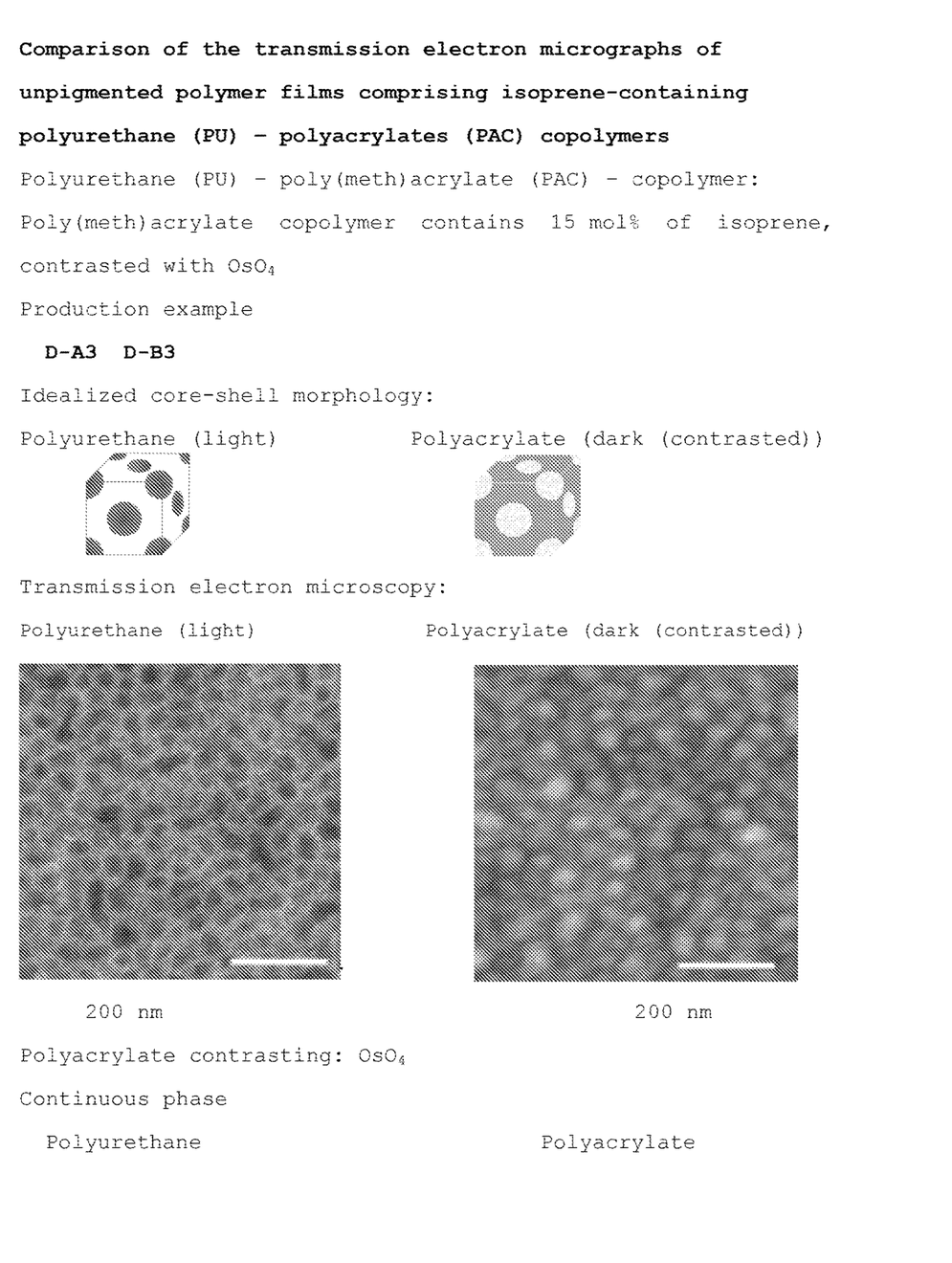

The electron microscopy analysis was effected in transmission (tab. 1, FIG. 1). This involved visualizing spherical particles having particle sizes less than 150 nm in a continuous matrix of dark or light appearance, which corresponds to a core-shell morphology:

TABLE 1

Transmission electron microscopy of unpigmented polymer films containing isoprene-containing polyurethane (PU)-polyacrylate (PAC) copolymers

| Polyurethane (PU)-polyacrylate (PAC) copolymer | | | |
|---|---|---|---|
| Preparation example | | D-A3 | D-B3 |
| Contains polyurethane dispersion | | D-P1 | D-P1 |
| Polyurethane contents | in % solids based on overall solids | 50 | 50 |
| Isoprene content in the polyacrylate copolymer | in mol % | 15 | 15 |
| Polymer film (unpigmented, dried under high vacuum) | | | |
| Transmission electron microscopy (Contrasting of polyacrylate: OsO4) | | | |
| Appearance of continuous phase | | Light | Dark |
| Appearance of discontinuous phase | | Dark | Light |
| Morphology | | Core-shell | Core-shell |

The above experiment shows that the core-shell structure of the copolymers of the inventive dispersions (D-B3) is the inverse of the structure of the copolymers known from the prior art (D-A3).

Production of Silver-Colored Waterborne Basecoats

The components listed in tables 2a, 2b, 3a and 3b under "aqueous phase" are stirred together in the sequence specified to give an aqueous mixture. In the next step, components listed under "organic phase" are used to produce an organic mixture. The organic mixture is added to the aqueous mixture. Then the mixture is stirred for 10 min and adjusted with the aid of deionized water and N,N-dimethylethanolamine (from BASF SE) to a pH of 8.0 and spraying viscosity.

TABLE 2a

Production of silver-colored waterborne basecoats for the determination of the pinholing limit and pinhole count, and the visibility of crosses ground in a multicoat paint system

| Component | Designation of the waterborne basecoat | | | | | |
|---|---|---|---|---|---|---|
| | BL-A0 | BL-A1 | BL-A2 | BL-A3 | BL-A4 | BL-A5 |
| | Parts by weight | | | | | |
| AQUEOUS PHASE | | | | | | |
| Aqueous solution of 3% sodium-lithium-magnesium sheet silicate solution Laponite ® RD (from Rockwood Additives) and 3% Pluriol ® P900 (from BASF SE) | 22.0 | 22.0 | 22.0 | 22.0 | 22.0 | 22.0 |
| Deionized water | 2.0 | 2.0 | 2.0 | 2.0 | 2.0 | 2.0 |
| Foamstar MF 324 (from Cognis) | 0.7 | 0.0 | 0.0 | 0.0 | 0.0 | 0.0 |
| 1-Octanol (from BASF SE) | 1.5 | 0.0 | 0.0 | 0.0 | 0.0 | 0.0 |
| Deionized water | 2.3 | 2.3 | 2.3 | 2.3 | 2.3 | 2.3 |
| Polyurethane acrylate, prepared according to example D, pages 7-8, of DE 4437535 A1 | 4.6 | 4.6 | 4.6 | 4.6 | 4.6 | 4.6 |
| TMDD 50% BG (from BASF SE), 50% solution of 2,4,7,9-tetramethyl-5-decyne-4,7-diol (CAS No. 126-86-3) in butylglycol | 0.9 | 0.9 | 0.9 | 0.9 | 0.9 | 0.9 |
| Polyester, prepared according to example D, page 10, of DE 4009858 C2 | 1.0 | 1.0 | 1.0 | 1.0 | 1.0 | 1.0 |
| Butylglycol (from BASF SE) | 1.8 | 1.8 | 1.8 | 1.8 | 1.8 | 1.8 |
| Luwipal ® 052 (from BASF SE), melamine-formaldehyde resin | 5.0 | 5.0 | 5.0 | 5.0 | 5.0 | 5.0 |
| TMDD 50% BG (from BASF SE), 50% solution of 2,4,7,9-tetramethyl-5-decyne-4,7-diol (CAS No. 126-86-3) in butylglycol | 0.7 | 0.7 | 0.7 | 0.7 | 0.7 | 0.7 |
| 10% solution of N,N-dimethylethanolamine (from BASF SE) in water | 0.5 | 0.5 | 0.5 | 0.5 | 0.5 | 0.5 |
| Pluriol ® P 900 (from BASF SE), polypropylene oxide | 0.7 | 0.7 | 0.7 | 0.7 | 0.7 | 0.7 |
| Isopropanol (from BASF SE) | 3.3 | 3.3 | 3.3 | 3.3 | 3.3 | 3.3 |
| Deionized water | 1.0 | 1.0 | 1.0 | 1.0 | 1.0 | 1.0 |
| 3.0% Viscalex ® HV30 (from BASF SE)-solution in water (rheology modifier) | 3.0 | 3.0 | 3.0 | 3.0 | 3.0 | 3.0 |
| Deionized water | 1.0 | 1.0 | 1.0 | 1.0 | 1.0 | 1.0 |
| 50.0% solution of DSX 1550 (from Cognis) in butylglycol (rheology agent) | 0.4 | 0.4 | 0.4 | 0.4 | 0.4 | 0.4 |
| Deionized water | 1.0 | 1.0 | 1.0 | 1.0 | 1.0 | 1.0 |
| Polyurethane-polyacrylate copolymer | | | | | | |
| According to preparation example D-A1 | 15.8 | 15.8 | | | | |
| According to preparation example D-A2 | | | 15.9 | | | |
| According to preparation example D-A4 | | | | 18.3 | | |
| According to preparation example D-A5 | | | | | 14.8 | |
| According to preparation example D-A6 | | | | | | 14.8 |
| Deionized water | 0.8 | 1.0 | 1.0 | 0.5 | 1.0 | 1.0 |
| 10% Dimethylethanolamine in water | 0.4 | 0.4 | 0.4 | 0.4 | 0.4 | 0.4 |
| TMDD 50% BG (from BASF SE), 50% solution of 2,4,7,9-tetramethyl-5-decyne-4,7-diol (CAS No. 126-86-3) in butylglycol | 0.5 | 0.5 | 0.5 | 0.5 | 0.5 | 0.5 |
| Deionized water | 0.0 | 2.0 | 2.0 | 0.0 | 3.0 | 3.0 |
| Isopar L (from ExxonMobil Chemical), solvent (isoparaffinic hydrocarbon) | 2.0 | 2.0 | 2.0 | 2.0 | 2.0 | 2.0 |
| Propanol (from BASF SE) | 0.9 | 0.9 | 0.9 | 0.9 | 0.9 | 0.9 |
| Deionized water | 1.5 | 1.5 | 1.5 | 1.5 | 1.5 | 1.5 |
| ORGANIC PHASE | | | | | | |
| Mixture of two commercially available aluminum pigments, STAPA Hydrolux 1071 Aluminum and STAPA Hydrolux VP No. 56450/G Aluminum (from Eckart Effect Pigments) | 6.5 | 6.5 | 6.5 | 6.5 | 6.5 | 6.5 |
| Butylglycol (from BASF SE) | 8.4 | 8.4 | 8.4 | 8.4 | 8.4 | 8.4 |
| Polyester, prepared according to example D, page 10, of DE 4009858 C2 | 2.0 | 2.0 | 2.0 | 2.0 | 2.0 | 2.0 |

TABLE 2b

Production of silver-colored waterborne basecoats for the determination of the pinholing limit and pinhole count, and the visibility of crosses ground in a multicoat paint system

| Component | BL-B1 | BL-B2 | BL-B3 | BL-B4 |
|---|---|---|---|---|
| | Parts by weight | | | |
| AQUEOUS PHASE | | | | |
| Aqueous solution of 3% sodium-lithium-magnesium sheet silicate solution Laponite ® RD (from Rockwood Additives) and 3% Pluriol ® P900 (from BASF SE) | 22.0 | 22.0 | 22.0 | 22.0 |
| Deionized water | 2.0 | 2.0 | 2.0 | 2.0 |
| Foamstar MF 324 (from Cognis) | 0.0 | 0.0 | 0.0 | 0.0 |
| 1-Octanol (from BASF SE) | 0.0 | 0.0 | 0.0 | 0.0 |
| Deionized water | 2.3 | 2.3 | 2.3 | 2.3 |
| Polyurethane acrylate, prepared according to example D, pages 7-8, of DE 4437535 A1 | 4.6 | 4.6 | 4.6 | 4.6 |
| TMDD 50% BG (from BASF SE), 50% solution of 2,4,7,9-tetramethyl-5-decyne-4,7-diol (CAS No. 126-86-3) in butylglycol | 0.9 | 0.9 | 0.9 | 0.9 |
| Polyester, prepared according to example D, page 10, of DE 4009858 C2 | 1.0 | 1.0 | 1.0 | 1.0 |
| Butylglycol (from BASF SE) | 1.8 | 1.8 | 1.8 | 1.8 |
| Luwipal ® 052 (from BASF SE), melamine-formaldehyde resin | 5.0 | 5.0 | 5.0 | 5.0 |
| TMDD 50% BG (from BASF SE), 50% solution of 2,4,7,9-tetramethyl-5-decyne-4,7-diol (CAS No. 126-86-3)in butylglycol | 0.7 | 0.7 | 0.7 | 0.7 |
| 10% solution of N,N-dimethylethanolamine (from BASF SE) in water | 0.5 | 0.5 | 0.5 | 0.5 |
| Pluriol ® P 900 (from BASF SE), polypropylene oxide | 0.7 | 0.7 | 0.7 | 0.7 |
| Isopropanol(from BASF SE) | 3.3 | 3.3 | 3.3 | 3.3 |
| Deionized water | 1.0 | 1.0 | 1.0 | 1.0 |
| 3.0% Viscalex ® HV30(from BASF SE)-solution in water (rheology modifier) | 3.0 | 3.0 | 3.0 | 3.0 |
| Deionized water | 1.0 | 1.0 | 1.0 | 1.0 |
| 50.0% solution of DSX 1550 (from Cognis) in butylglycol (rheology agent) | 0.4 | 0.4 | 0.4 | 0.4 |
| Deionized water | 1.0 | 1.0 | 1.0 | 1.0 |
| Polyurethane-polyacrylate copolymer | | | | |
| According to preparation example D-B1 | 15.8 | | | |
| According to preparation example D-B2 | | 15.8 | | |
| According to preparation example D-B4 | | | 18.3 | |
| According to preparation example D-B5 | | | | 15.6 |
| Deionized water | 1.0 | 1.0 | 0.5 | 1.0 |
| 10% Dimethylethanolamine in water | 0.4 | 0.4 | 0.4 | 0.4 |
| TMDD 50% BG (from BASF SE), 50% solution of 2,4,7,9-tetramethyl-5-decyne-4,7-diol (CAS No. 126-86-3) in butylglycol | 0.5 | 0.5 | 0.5 | 0.5 |
| Deionized water | 2.0 | 2.0 | 0.0 | 2.2 |
| Isopar L (from ExxonMobil Chemical), solvent (isoparaffinic hydrocarbon) | 2.0 | 2.0 | 2.0 | 2.0 |
| Propanol (from BASF SE) | 0.9 | 0.9 | 0.9 | 0.9 |
| Deionized water | 1.5 | 1.5 | 1.5 | 1.5 |
| ORGANIC PHASE | | | | |
| Mixture of two commercially available aluminum pigments, STAPA Hydrolux 1071 Aluminum and STAPA Hydrolux VP No. 56450/G Aluminum (from Eckart Effect Pigments) | 6.5 | 6.5 | 6.5 | 6.5 |
| Butylglycol (from BASF SE) | 8.4 | 8.4 | 8.4 | 8.4 |
| Polyester, prepared according to example D, page 10, of DE 4009858 C2 | 2.0 | 2.0 | 2.0 | 2.0 |

TABLE 3a

Production of silver-colored waterborne basecoats for the determination of cross-cutting

| Component | BL-C1 | BL-C2 | BL-C3 | BL-C4 | BL-C5 | BL-C6 | BL-C7 |
|---|---|---|---|---|---|---|---|
| | Parts by weight | | | | | | |
| AQUEOUS PHASE | | | | | | | |
| Aqueous solution of 3% sodium-lithium-magnesium sheet silicate solution Laponite ® RD (from Rockwood Additives) and 3% Pluriol ® P900 (from BASF SE) | 20.0 | 20.0 | 20.0 | 20.0 | 20.0 | 20.0 | 20.0 |
| Deionized water | 6.2 | 6.2 | 6.2 | 6.2 | 6.2 | 6.2 | 6.2 |
| Polyurethane acrylate, prepared according to example D, pages 7-8, of DE 4437535 A1 | 4.9 | 4.9 | 4.9 | 4.9 | 4.9 | 4.9 | 4.9 |
| TMDD 50% BG (from BASF SE), 50% solution of 2,4,7,9-tetramethyl-5-decyne-4,7-diol (CAS No. 126-86-3) in butylglycol | 0.9 | 0.9 | 0.9 | 0.9 | 0.9 | 0.9 | 0.9 |
| Butylglycol (BASF SE) | 0.8 | 0.8 | 0.8 | 0.8 | 0.8 | 0.8 | 0.8 |
| Luwipal ® 052 (from BASF SE), melamine-formaldehyde resin | 5.7 | 5.7 | 5.7 | 5.7 | 5.7 | 5.7 | 5.7 |
| TMDD 50% BG (from BASF SE), 50% solution of 2,4,7,9-tetramethyl-5-decyne-4,7-diol (CAS No. 126-86-3) in butylglycol | 0.8 | 0.8 | 0.8 | 0.8 | 0.8 | 0.8 | 0.8 |
| 10% solution of N,N-dimethylethanolamine (from BASF SE) in water | 0.6 | 0.6 | 0.6 | 0.6 | 0.6 | 0.6 | 0.6 |
| Pluriol ® P 900 (from BASF SE),polypropylene oxide | 0.8 | 0.8 | 0.8 | 0.8 | 0.8 | 0.8 | 0.8 |
| Deionized water | 2.2 | 2.2 | 2.2 | 2.2 | 2.2 | 2.2 | 2.2 |

TABLE 3a-continued

Production of silver-colored waterborne basecoats for the determination of cross-cutting

| Component | Designation of the waterborne basecoat | | | | | | |
|---|---|---|---|---|---|---|---|
| | BL-C1 | BL-C2 | BL-C3 | BL-C4 | BL-C5 | BL-C6 | BL-C7 |
| | Parts by weight | | | | | | |
| 3.0% Viscalex ® HV30 (from BASF SE)-solution in water (rheology modifier) | 3.0 | 3.0 | 3.0 | 3.0 | 3.0 | 3.0 | 3.0 |
| Deionized water | 1.1 | 1.1 | 1.1 | 1.1 | 1.1 | 1.1 | 1.1 |
| 50.0% solution of DSX 1550 (from Cognis) in butylglycol (rheology agent) | 0.2 | 0.2 | 0.2 | 0.2 | 0.2 | 0.2 | 0.2 |
| Deionized water | 1.1 | 1.1 | 1.1 | 1.1 | 1.1 | 1.1 | 1.1 |

TABLE 3b

Production of silver-colored waterborne basecoats for the determination of cross-cutting

| Component | Designation of the waterborne basecoat | | | | | | |
|---|---|---|---|---|---|---|---|
| | BL-C1 | BL-C2 | BL-C3 | BL-C4 | BL-C5 | BL-C6 | BL-C7 |
| | Parts by weight | | | | | | |
| Polyurethane-polyacrylate copolymer | | | | | | | |
| According to preparation example D-A1 | 18.8 | | | | | | |
| According to preparation example D-A2 | | 19.0 | | | | | |
| According to preparation example D-A4 | | | 21.8 | | | | |
| According to preparation example D-B1 | | | | 18.8 | | | |
| According to preparation example D-B2 | | | | | 18.9 | | |
| According to preparation example D-B4 | | | | | | 21.7 | |
| According to preparation example D-C1 | | | | | | | 18.6 |
| Deionized water | 1.1 | 1.0 | 0.0 | 1.1 | 1.1 | 0.0 | 1.3 |
| 10% Dimethylethanolamine in water | 0.5 | 0.5 | 0.5 | 0.5 | 0.5 | 0.5 | 0.5 |
| Isopar L (from ExxonMobile Chemical), solvent (isoparaffinic hydrocarbon) | 2.1 | 2.1 | 2.1 | 2.1 | 2.1 | 2.1 | 2.1 |
| Deionized water | 5.0 | 5.0 | 3.2 | 5.0 | 5.0 | 3.2 | 5.0 |
| ORGANIC PHASE | | | | | | | |
| Mixture of two commercially available aluminum pigments, STAPA Hydrolux 1071 Aluminum and STAPA Hydrolux VP No. 56450/G Aluminum (from Eckart Effect Pigments) | 5.6 | 5.6 | 5.6 | 5.6 | 5.6 | 5.6 | 5.6 |
| Butylglycol (from BASF SE) | 6.6 | 6.6 | 6.6 | 6.6 | 6.6 | 6.6 | 6.6 |
| Mixing varnish, prepared according to preparation example 1 of WO 2006/040284 A1 (page 14 lines 15-27), according to preparation example 1 consisting of a graft copolymer, deionized water, Surfynol ® 100 (from Air Products), Hydropalat ® 3037 (from Cognis, a polyoxylene derivative of castor oil) and 1-propoxy-2-propanol | 5.5 | 5.5 | 5.5 | 5.5 | 5.5 | 5.5 | 5.5 |

Comparative Experiments Between the Waterborne Basecoats BL-A0 to BL-A5 with the Inventive Waterborne Basecoats BL-B1 to BL-B4 with Regard to Pinholing Limit, Pinhole Count and Visibility of Crosses Ground in Multicoat Paint Systems To determine the pinholing limit, the pinhole count and the capacity to conceal ground crosses, multicoat paint systems comprising waterborne basecoats BL-A0 to BL-B4 were examined.

While waterborne basecoat BL-A0 contained Foamstar MF 324 (from Cognis) and 1-octanol (from BASF SE), all other waterborne basecoats BL-A1 to BL-B4 were free of these two components.

To determine the pinholing limit and the pinhole count, the multicoat paint systems were produced with the waterborne basecoats according to the following general method:

A steel panel of dimensions 30 cm×50 cm coated with a primer-surfacer coat was provided with an adhesive strip along one longitudinal edge, in order to be able to determine the differences in layer thickness after the coating. The waterborne basecoat was applied electrostatically in wedge format. The resulting waterborne basecoat film was flashed off at room temperature for one minute and then dried at 70° C. in an air circulation oven for 10 minutes. A customary two-component clearcoat was applied to the dried waterborne basecoat film. The resulting clearcoat film was flashed off at room temperature for 20 minutes. Subsequently, the waterborne basecoat film and clearcoat film were cured jointly in an air circulation oven at 140° C. for 20 minutes. The layer thickness of the cured clearcoat film was constant (±1 μm) over the entire sheet, with a clearcoat film thickness of 38 to 42 μm.

After the visual assessment of the pinholes in the resulting wedge-shaped multicoat paint system, the coat thickness for the pinholing limit was determined.

In addition, the capacity to conceal ground crosses was compared:

For this purpose, a coiled panel of dimensions 30×60 cm was painted with a primer-surfacer and the primer-surfacer was baked at 160° C. over a period of 20 minutes. A piece of abrasive paper having 800 particles per cm² on the surface was used to grind a cross into the sheet, which had a depth of 2-4 µm and a furrow width of 2 cm. Subsequently, the appropriate basecoat was applied with a coat thickness of 8-12 µm. Subsequently, the resulting panel was dried at 80° C. for 10 minutes, and a customary and known two-component clearcoat was applied to the dried waterborne basecoat film. Subsequently, the waterborne basecoat film and clearcoat film were cured jointly in an air circulation oven at 140° C. for 20 minutes.

The visibility of the cross ground in the multicoat paint system was determined visually and assessed on a scale from 1 to 5. On this scale, high numerical values indicate good visibility of the ground cross and low numerical values good concealment of the ground crosses.

Tables 4 and 5 give an overview of the results of the determination of pinholing limit, pinhole count and capacity to conceal ground crosses for the multicoat paint systems:

TABLE 4

Results of the determination of pinholing limit, pinhole count and capacity to conceal ground crosses for the multicoat paint systems based on the waterborne basecoats BL-A0 to BL-A3 and BL-B1 to BL-B3

| | Waterborne basecoat | | | | | | |
|---|---|---|---|---|---|---|---|
| | BL-A0 | BL-A1 | BL-A2 | BL-A3 | BL-B1 | BL-B2 | BL-B3 |
| Polyurethane dispersion | D-P1 | D-P1 | D-P2 | D-P1 | D-P1 | D-P2 | D-P1 |
| Copolymer | D-A1 | D-A1 | D-A2 | D-A4 | D-B1 | D-B2 | D-B4 |
| Foamstar MF324/1-octanol | Yes | No | No | No | No | No | No |
| Pinholing limit/$10^{-6}$ m | 16 | 9 | 10 | 16 | 21 | 21 | 19 |
| Pinhole count | 17 | 127 | 145 | 101 | 11 | 7 | 23 |
| Visibility of ground cross | 4 | 4 | 4 | 4 | 3 | 3 | 3 |

TABLE 5

Results of the determination of pinholing limit, pinhole count and capacity to conceal ground crosses for the multicoat paint systems based on the waterborne basecoats BL-A4, BL-A5, and BL-B4

| | Waterborne basecoat | | |
|---|---|---|---|
| | BL-A4 | BL-A5 | BL-B4 |
| Polyurethane dispersion | D-P4 | D-P4 | D-P4 |
| Copolymer | D-A5 | D-A6 | D-B5 |
| Pinholing limit/$10^{-6}$ m | 14 | 17 | 27 |
| Pinhole count | >200 | >200 | 90 |
| Visibility of ground cross | 4 | 4 | 3 |

Comparative Tests Between the Waterborne Basecoats BL-C1 to BL-C3 and the Inventive Waterborne Basecoats BL-C4 to BL-C7 with Regard to the Improvement in Cross-Cut Results To determine the cross-cut, multicoat paint systems comprising comparative waterborne basecoats BL-C1 to BL-C3 and the inventive waterborne basecoats BL-C4 to BL-C7 were examined.

This was done using a panel of dimensions 10 cm×20 cm, which had a primer-surfacer coat of a commercial standard primer-surfacer as the substrate. In the production of this substrate, the primer-surfacer was dried intermediately at 80° C. over a period of 10 min and then baked at 190° C. over a period of 30 min.

First of all, a basecoat material according to table 6 was applied pneumatically in each case to this panel. After the basecoat material had been flashed off at room temperature for 1 min, the basecoat material was dried intermediately in an air circulation oven at 70° C. over the course of 10 min. Subsequently, the two-component clearcoat material FF99-0345 commercially available from BASF was likewise applied pneumatically and, after flashing off at room temperature for 20 min, the two layers were baked at a temperature of 160° C. over a period of 30 min. The result was an overbaked multicoat paint system.

After cooling the overbaked multicoat paint system, the paint systems were abraded. Subsequently, the particular basecoat material according to table 3 was applied pneumatically. After the basecoat material had been flashed off at room temperature for 1 minute, the basecoat material was dried intermediately in an air circulation oven at 70° C. over the course of 10 min. Subsequently, the two-component refinishing clearcoat material composed of FF23-0500 and SC29-0093 commercially available from BASF was applied pneumatically and, after flashing off at room temperature for 20 min, the two layers were baked at a temperature of 80° C. over a period of 30 min. The result was a refinished paint system.

The adhesion was examined on the underbaked refinished paint system atop the abraded, overbaked multicoat paint system by the cross-cut test.

The cross-cut test was conducted to DIN 2409. The assessment of the results of the cross-cut test was conducted to DIN EN ISO 2409.

Table 6 gives an overview of the results of the cross-cut test with comparison of the various waterborne basecoat materials:

TABLE 6

Results of the cross-cut test on a refinished paint system atop an overbaked multicoat paint system based on the waterborne basecoat materials BL-C1 to BL-C3 compared with the inventive waterborne basecoats BL-C4 to BL-C7

| | Waterborne basecoat material | | | | | | |
|---|---|---|---|---|---|---|---|
| | BL-C1 | BL-C2 | BL-C3 | BL-C4 | BL-C5 | BL-C6 | BL-C7 |
| Polyurethane dispersion | D-P1 | D-P2 | D-P1 | D-P1 | D-P1 | D-P2 | D-P3 |
| Copolymer | D-A1 | D-A2 | D-A4 | D-B1 | D-B2 | D-B4 | D-C1 |
| Cross-cut (mark) | 4 | 4 | 4 | 2.5 | 2.5 | 2.5 | 1 |

The invention claimed is:

1. An aqueous dispersion, comprising at least one copolymer obtained by
(i) initially charging an aqueous dispersion of at least one polyurethane, and then (ii) polymerizing a mixture of olefinically unsaturated monomers in the presence of the polyurethane,
wherein:
the polymerizing occurs in the presence of a water-soluble initiator;
a metered addition of the olefinically unsaturated monomers occurs such that a concentration of 6.0% by weight, based on a total amount of the olefinically unsaturated monomers, in a reaction solution of the polymerizing is not exceeded during the entire duration of the polymerizing; and
the mixture of the olefinically unsaturated monomers comprises at least one polyolefinically unsaturated monomer.

2. The aqueous dispersion as claimed in claim 1, wherein the metered addition of the olefinically unsaturated monomers occurs such that a concentration of 5.0% by weight, based on the total amount of the olefinically unsaturated monomers, in the reaction solution is not exceeded during the entire duration of the polymerizing.

3. The aqueous dispersion as claimed in claim 2, wherein the metered addition of the olefinically unsaturated monomers occurs such that a concentration of 4.0% by weight, based on the total amount of olefinically unsaturated monomers, in the reaction solution is not exceeded during the entire duration of the polymerizing.

4. The aqueous dispersion of claim 1, wherein the mixture of the olefinically unsaturated monomers comprises 0.1 to 6.0 mol % of the at least one polyolefinically unsaturated monomer.

5. The aqueous dispersion of claim 1, wherein the mixture of the olefinically unsaturated monomers comprises 0.1 to 2.0 mol % of the at least one polyolefinically unsaturated monomer.

6. The aqueous dispersion of claim 1, wherein the mixture of the olefinically unsaturated monomers comprises 0.1 to 6.0 mol % of allyl methacrylate and does not contain any further polyolefinically unsaturated monomers.

7. The aqueous dispersion of claim 1, wherein the mixture of the olefinically unsaturated monomers comprises 0.1 to 2.0 mol % of allyl methacrylate and does not contain any further polyolefinically unsaturated monomers.

8. The aqueous dispersion of claim 1, wherein the mixture of olefinically unsaturated monomers comprises less than 10.0% by weight of vinylaromatic monomers, based on the total amount of olefinically unsaturated monomers.

9. The aqueous dispersion of claim 1, wherein the mixture of olefinically unsaturated monomers comprises less than 5.0% by weight of vinylaromatic monomers, based on the total amount of olefinically unsaturated monomers.

10. The aqueous dispersion of claim 1, wherein the mixture of olefinically unsaturated monomers does not contain any vinylaromatic monomers.

11. The aqueous dispersion of claim 1, wherein the aqueous dispersion has a gel content of 40 to 90% by weight, based on solids in the dispersion.

12. The aqueous dispersion of claim 1, wherein the copolymer comprises
(A) a core comprising at least one polyurethane, and
(B) a shell comprising at least one polymer obtained by polymerization of olefinically unsaturated monomers.

13. A coating material, comprising the aqueous dispersion of claim 1.

14. A waterborne basecoat, comprising the aqueous dispersion of claim 1.

15. A process for producing a multicoat color and/or effect paint system, the process comprising
(i) applying a pigmented waterborne basecoat to a substrate,
(ii) forming a polymer film from the pigmented waterborne basecoat applied in stage (i),
(iii) applying a clearcoat layer to the polymer film as a basecoat layer, and then
(iv) curing the basecoat layer together with the clearcoat layer,
wherein the pigmented waterborne basecoat comprises the aqueous dispersion of claim 1.

16. The process of claim 15, wherein the substrate is an automobile body, a plastic part for installation of an automobile body, or both.

17. A process for producing the aqueous dispersion of claim 1, the process comprising
(i) initially charging an aqueous dispersion of at least one polyurethane, and then
(ii) polymerizing a mixture of olefinically unsaturated monomers in the presence of the polyurethane,
wherein:
the polymerizing occurs in the presence of a water-soluble initiator;
a metered addition of the olefinically unsaturated monomers occurs such that a concentration of 6.0% by weight, based on a total amount of the olefinically unsaturated monomers, in a reaction solution of the polymerizing is not exceeded during the entire duration of the polymerizing; and
the mixture of the olefinically unsaturated monomers comprises at least one polyolefinically unsaturated monomer.

* * * * *